(12) United States Patent
Jung et al.

(10) Patent No.: US 8,867,992 B2
(45) Date of Patent: Oct. 21, 2014

(54) MOBILE TERMINAL AND CONTROLLING METHOD THEREOF

(71) Applicant: LG Electronics Inc., Seoul (KR)

(72) Inventors: Jaehee Jung, Seoul (KR); Eunji Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 13/673,535

(22) Filed: Nov. 9, 2012

(65) Prior Publication Data

US 2014/0080410 A1 Mar. 20, 2014

(30) Foreign Application Priority Data

Sep. 20, 2012 (KR) .......................... 10-2012-0104400

(51) Int. Cl.
*H04B 5/00* (2006.01)
*H04W 24/00* (2009.01)

(52) U.S. Cl.
CPC ........................................ *H04B 5/00* (2013.01)
USPC ................... 455/41.1; 455/456.1; 455/456.3; 455/456.6

(58) Field of Classification Search
USPC ........................ 455/41.1, 456.1, 456.3, 456.6
See application file for complete search history.

(56) References Cited

U.S. PATENT DOCUMENTS

2013/0017780 A1* 1/2013 Rose et al. .................... 455/41.1
2014/0143105 A1* 5/2014 Shaw et al. ..................... 705/30

FOREIGN PATENT DOCUMENTS

WO PCT/NZ2012/000134 * 2/2013

* cited by examiner

*Primary Examiner* — Ping Hsieh
*Assistant Examiner* — James Yang
(74) *Attorney, Agent, or Firm* — Birch, Stewart, Kolasch & Birch, LLP

(57) ABSTRACT

A mobile terminal and controlling method thereof are discussed, by which if a situation recognized by contacting with an external NFC tag corresponds to a user-set situation, a function different from a function set in the external NFC tag is activated. The method can include setting a $1^{st}$ operation to be performed in case of recognizing at least one external NFC tag and a $2^{nd}$ operation to be performed in case of recognizing the external NFC tag in a specific situation, performing the $1^{st}$ operation if the external NFC tag is recognized via an NFC module, and performing the $2^{nd}$ operation if the external NFC tag is recognized in the specific situation via the NFC module.

25 Claims, 33 Drawing Sheets (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND CONTROLLING METHOD THEREOF

Pursuant to 35 U.S.C. §119(a), this application claims the benefit of earlier filing date and right of priority to Korean Application No. 10-2012-0104400, filed on Sep. 20, 2012, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, since such mobile (or portable) terminal as smart phones, smart tablets and the like are widely used, various kinds of short-range communication modules capable of interactive short-range communication functions of normal information exchange between mobile terminals, transmitting payment information to a payment terminal and the like are provided to the mobile terminals. And, the demand for methods of exchanging informations more conveniently using such short-range communication modules is increasingly rising.

NFC (near field communication) electronic tag is popularly used as the short-range communication module.

A mobile terminal reads information recorded in NFC tag provided to an external place or an external device or records desired information in the NFC tag.

Currently, if a user sets up a function of a mobile terminal, the function can be activated using an NFC tag.

In particular, a user sets up a function of a mobile terminal, which will be activated when the mobile terminal recognizes the NFC tag. If the NFC tag is touched and recognized, the mobile terminal can activate the user-set function.

However, when a mobile terminal comes in contact with an NFC tag, a function set up by a user or a function set to a default is just provided to a user. Thus, the mobile terminal is unable to provide other functions except the previously set functions in consideration of a situation on touching the NFC tag.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which if a situation recognized by contacting with an external NFC tag corresponds to a user-set situation, a function different from a function set in the external NFC tag is activated.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include an NFC module recognizing at least one NFC (Near Field Communication) tag, and to read information recorded in the external NFC tag, a memory configured to store a $1^{st}$ operation performed in case of recognizing the external NFC tag and a $2^{nd}$ operation performed in case of recognizing the external NFC tag in a specific situation, and a controller configured to perform the $1^{st}$ operation if the external NFC tag is recognized via the NFC module, and to perform the $2^{nd}$ operation if the external NFC tag is recognized in the specific situation via the NFC module.

In another aspect of the present invention, a method of controlling a mobile terminal according to the present invention may include the steps of setting a $1^{st}$ operation to be performed in case of recognizing at least one external NFC tag and a $2^{nd}$ operation to be performed in case of recognizing the external NFC tag in a specific situation, performing the $1^{st}$ operation if the external NFC tag is recognized via an NFC module, and performing the $2^{nd}$ operation if the external NFC tag is recognized in the specific situation via the NFC module.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
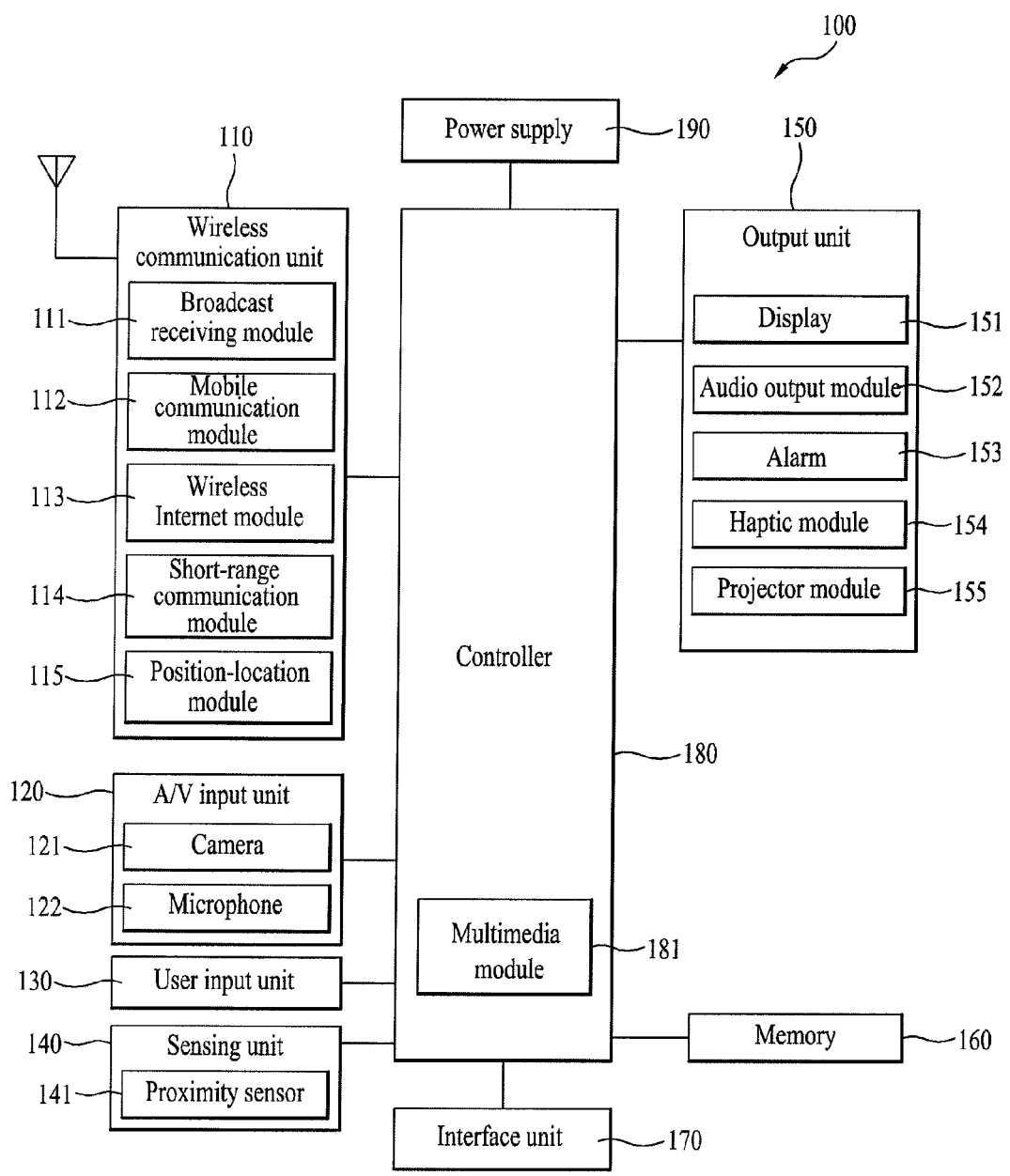
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™, or Near Field Communication (NFC).

The NFC is the short-range wireless access specification using magnetic field induction between near devices and includes one of Ecma 340, ISO/IEC 18092 and the like.

This communication scheme is a sort of RFID (radio frequency identification) and uses a frequency band of 13.56 MHz similar to that of a smart card but has a big difference from the smart card supportive of a unidirectional communication only in supporting bidirectional (or interactive) communications.

In particular, unlike the smart card that just plays a role as a tag configured to store and transmit specific information to a reader, the NFC may be able to play a role as a reader/writer configured to read/write tag information as well as a tag, if necessary. In case that the NFC is provided to each of terminals at both sides, it may be usable for P2P (point to point) information exchange.

Compared to Bluetooth, the present technology may implement a relatively high security level and have advantage in providing fast connection. Although the NFC has a communication range (e.g., maximum 10 to 20 cm) shorter than that of the Bluetooth, it is advantageous in reducing confusion in a complicated space to the contrary. The NFC is able to directly establish a communication if located in short distance without a separate user's recognition. Since the NFC has a relatively short communication time, it is also advantageous for security.

In the following description, assume that the short-range information exchange is performed by NFC and that the mobile terminal 100 is provided with an NFC module, which is capable of performing an NFC function, as the short range communication module 114.

If at least one external NFC tag comes in contact (e.g., direct contact, proximity contact, etc.) with the NFC module, the NFC module recognizes the external NFC tag, reads information recorded in the external NFC tag, and then outputs the read information to the controller 180.

For instance, the NFC module reads unique device information (e.g., identity information) of the external NFC tag and then outputs the read unique device information to the controller 180. Subsequently, the controller 180 may be then able to perform the function set in the unique device information of the external NFC tag.

In particular, when a different function is set per unique device information of each NFC tag in the memory 160, the controller 180 acquires at least one function set in the unique device information of the NFC tag recognized via the NFC module from the memory 160 and may be then able to activate the acquired function.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photoelectric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (XD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identity module (SIM) or a universal subscriber identity module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
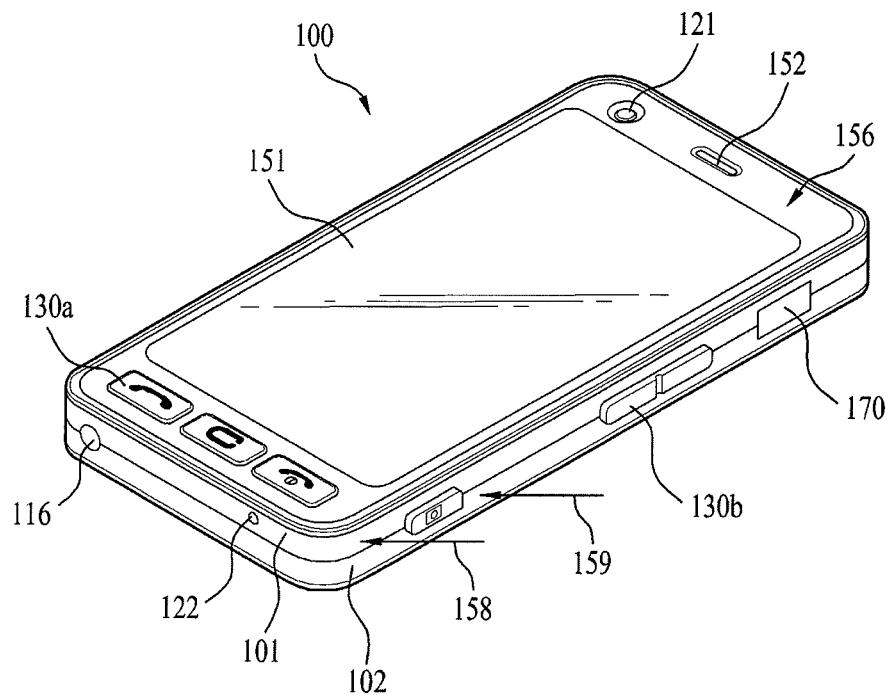
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
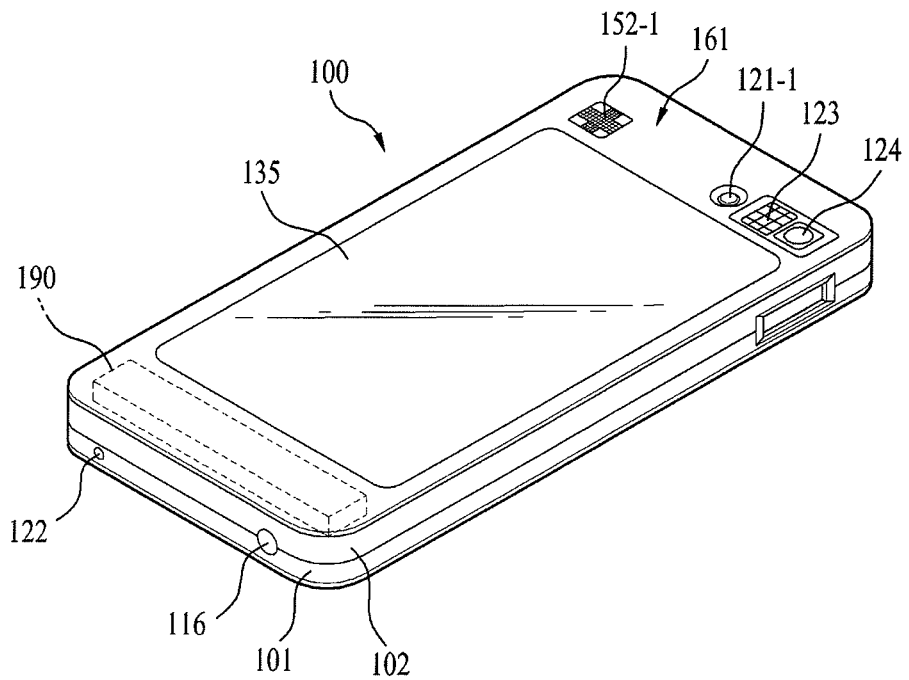
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, a process for controlling an operation of a mobile terminal using at least one external NFC tag according to the present invention is explained with reference to FIGS. 3 to 33.

First of all, processes for setting an operation, which will be performed when an NFC tag is recognized, are described in detail with reference to FIGS. 3 to 24 as follows.

Figure 3:
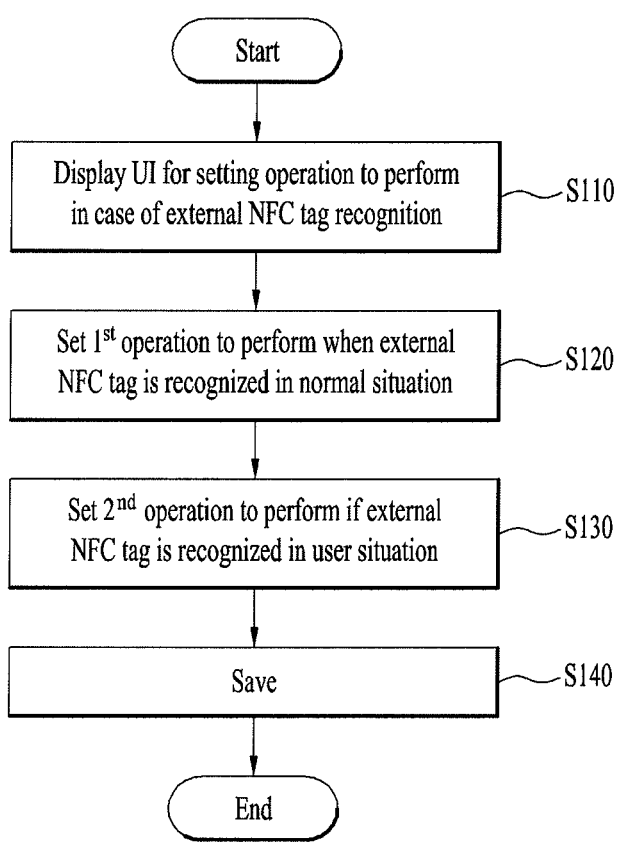
FIG. 3 is a flowchart of a process for setting operations to perform in case of recognizing an external NFC tag according to one embodiment of the present invention.

FIG. 3 is a flowchart of a process for setting operations to perform in case of recognizing an external NFC tag according to one embodiment of the present invention.

FIGS. 4 to 24 are diagrams for describing a process for setting operations to perform in case of recognizing an external NFC tag according to one embodiment of the present invention.

Referring to FIG. 3, in response to a request made by a user, the controller 180 of the mobile terminal 100 controls an operation setting UI (user interface), which is provided to set up an operation to be performed if an external NFC tag is recognized, to be displayed on the touchscreen 151 [S110].

In doing so, the operation setting UI may be selected by the user via the user input unit 130 or the touchscreen 151. Alternatively, the operating setting UI may be displayed if the external NFC tag is recognized via the NFC module. In particular, the user may be able to set up operations, which will be performed if the NFC tag is recognized, via the operation setting UI before the NFC tag comes in contact with the mobile terminal 100. Alternatively, the user may be able to set up operations, which will be performed if the NFC tag is recognized, via the operation setting UI when the NFC tag comes in contact with the mobile terminal 100.

The operation setting UI enables at least one or more external NFC tags with the mobile terminal 100 in accordance with the user's settings. And, the operation setting UI provides a function of setting different operations that will be performed when the at least one or more registered external NFC tags are recognized by the mobile terminal 100, respectively.

The operation setting UI provides a function of setting up a $1^{st}$ operation, which will be performed if a specific external NFC tag is recognized, and a $2^{nd}$ operation, which will be performed in the specific external NFC tag is recognized in a specific situation, in accordance with the user's settings. And, the operation setting UI provides a function of setting up a specific situation in which at least one or more situations (i.e., condition for performing the $2^{nd}$ operation, etc.) are combined together.

In the following description, a state that the external NFC tag is recognized in a situation except the specific situation shall be named 'normal situation' and a situation that the external NFC tag is recognized in the specific situation shall be named 'user situation'.

In particular, the user situation may include one situation or a combined situation of at least two, which selected from the group consisting of a situation corresponding to the external NFC tag recognized time/time slot, a situation corresponding to a current location of the mobile terminal 100 on recognizing the external NFC tag, a situation that a current location of the mobile terminal corresponds to a specific destination when the mobile terminal 100 arrives after the recognition of the external NFC tag, a situation that a specific function is active in the mobile terminal 100 on recognizing the external NFC tag, and a situation that a specific event occurs in the mobile terminal 100 on recognizing the external NFC tag.

Thus, if the 1$^{st}$ operation, which will be performed when the external NFC tag is recognized in the normal situation, is set up via the operation setting UI [S120] and if the 2$^{nd}$ operation, which will be performed when the external NFC tag is recognized in the user situation, is set up via the operation setting UI [S130], the controller 190 controls the result of the settings to be saved in the memory 160 [S140].

In the following description, the operation setting UI described with reference to FIG. 3, a process for setting a specific situation, and a process for setting a 2$^{nd}$ operation, which will be performed if an external NFC tag is recognized is a user situation, are explained in detail with reference to FIGS. 4 to 24.

FIGS. 4 to 24 are diagrams to describe processes for setting operations, which will be performed in case of external NFC tag recognition, according to the present invention.

Figure 4:
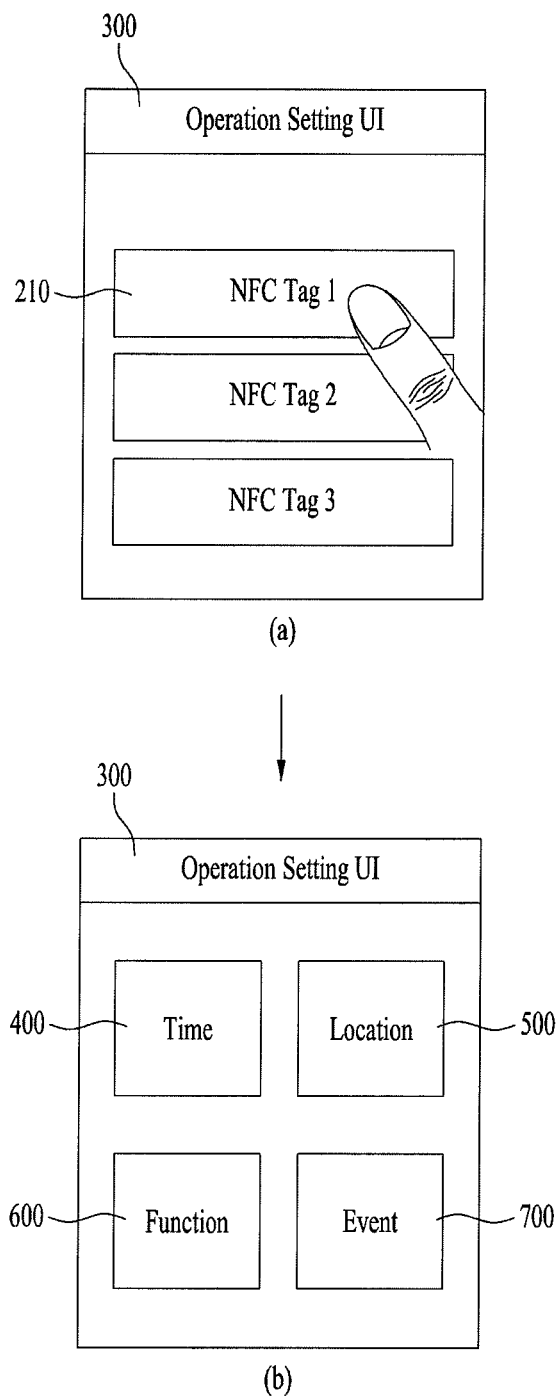
FIGS. 4 to 24 are diagrams for describing a process for setting operations to perform in case of recognizing an external NFC tag according to one embodiment of the present invention.

FIG. 4 (a) shows that an operation setting UI (user interface) 300 for setting an operation in case of external NFC tag recognition is displayed on the touchscreen 151.

The operation setting UI 300 may be selected by a user via the user input unit 130 or the touchscreen 151. Alternatively, the operation setting UI 300 may be displayed when a specific external NFC tag is recognized via the NFC module.

FIG. 4 (a) shows that NFC tags, which are previously registered or currently recognized, are contained in the operation setting UI 300.

For instance, 1$^{st}$ to 3$^{rd}$ NFC tags shown in FIG. 4 (a) may include the tags previously registered by a user. In this case, a 1$^{st}$ operation, which will be performed when each of the 1$^{st}$ to 3$^{rd}$ NFC tags is recognized in a normal situation via the NFC module, is saved in the memory 160.

For another instance, the 2$^{nd}$ and 3$^{rd}$ NFC tags are the previously registered tags and the 1$^{st}$ tag 210 may be the tag currently displayed within the operation setting UI 300 by being initially recognized via the NFC module. In this case, a 1$^{st}$ operation, which will be performed when each of the 2$^{nd}$ and 3$^{rd}$ NFC tags is recognized in a normal situation via the NFC module, is saved in the memory 160. Yet, the 1$^{st}$ operation may not be set for the initially recognized 1$^{st}$ NFC tag 210. In doing so, a user may be able to set up a 1$^{st}$ operation, which is performed when the 1$^{st}$ NFC tag 210 is recognized in a normal situation, and a 2$^{nd}$ operation, which is performed when the 1$^{st}$ NFC tag 210 is recognized in a user situation of the present invention, via the operation setting UI 300.

In the following description, assume that a 1$^{st}$ operation, which is performed when each of the external NFC tags is recognized in a normal situation, is basically set in the memory 160.

Meanwhile, the 1$^{st}$ operation may become a function set by a user among all functions that are provided to and executable in the mobile terminal 100. In particular, the 1$^{st}$ operation may include at least one of applications, widgets, menus and data, which are provided to the mobile terminal 100.

Referring to FIG. 4, if the 1$^{st}$ NFC tag 210 is selected by a user [FIG. 4 (a)], the controller 180 controls a user situation menu to be displayed within the operation setting UI 300 [FIG. 4 (b)].

FIG. 4 (b) shows icons for setting types of the user situation, and more particularly, a time situation setting icon 400 for setting a time related situation, a location situation setting icon 500 for setting a location related situation, a function situation setting icon 600 for setting a function related situation, and an event situation setting icon 700 for setting an event related situation.

In particular, if the time situation setting icon 400 is selected, the controller 180 displays a time setting window and a 2$^{nd}$ operation setting window for setting a 2$^{nd}$ operation, which will be performed when the 1$^{st}$ NFC tag 210 is recognized at the time set up via the time setting window, within the operation setting UI 300.

In particular, if the location situation setting icon 500 is selected, the controller 180 displays a current location setting window and a 2$^{nd}$ operation setting window for setting a 2$^{nd}$ operation, which will be performed when the 1$^{st}$ NFC tag 210 is recognized at a current location set up via the current location setting window, within the operation setting UI 300.

Alternatively, if the location situation setting icon 500 is selected, the controller 180 displays a destination location setting window and a 2$^{nd}$ operation setting window for setting a 2$^{nd}$ operation, which will be performed when the mobile terminal 100 arrives at a destination location set up via the destination location setting window after recognition of the 1$^{st}$ NFC tag 210, within the operation setting UI 300.

In particular, if the function situation setting icon 600 is selected, the controller 180 displays a function setting window and a 2$^{nd}$ operation setting window for setting a 2$^{nd}$ operation, which will be performed when the 1$^{st}$ NFC tag 210 is recognized in a situation that a function set up via the function setting window is active, within the operation setting UI 300.

In particular, if the event situation setting icon 700 is selected, the controller 180 displays an event setting window and a 2$^{nd}$ operation setting window for setting a 2$^{nd}$ operation, which will be performed when the 1$^{st}$ NFC tag 210 is recognized in a situation that an event set up via the event setting window occurs in the mobile terminal 100, within the operation setting UI 300.

Figure 5:
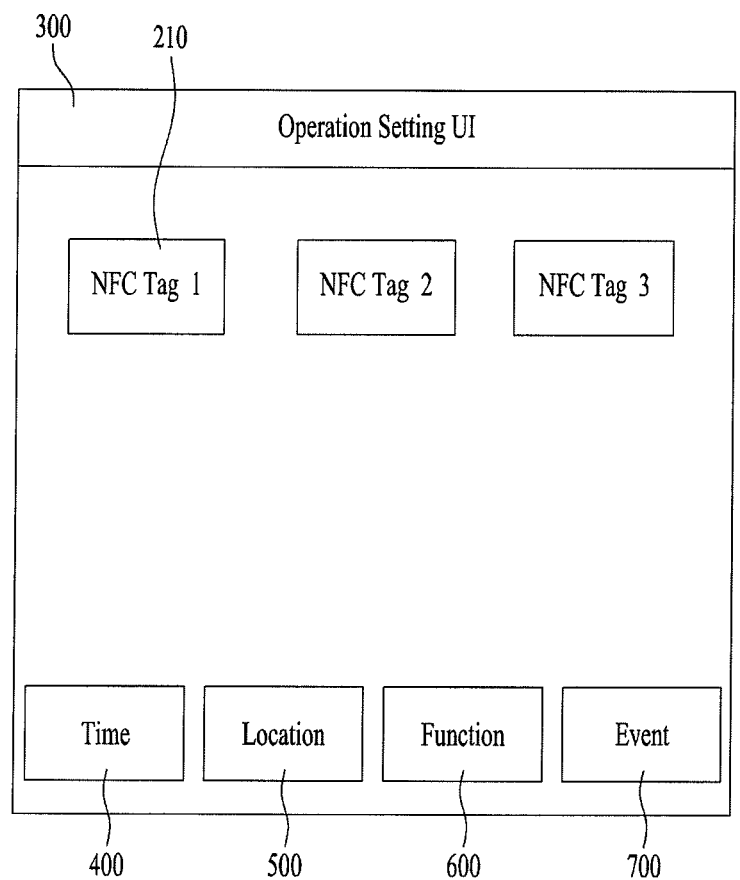

Meanwhile, referring to FIG. 5, the controller 180 may be able to display the 1$^{st}$ to 3$^{rd}$ NFC tags, the time situation setting icon 400, the location situation setting icon 500, the function situation setting icon 600 and the event situation setting icon 700 within the operation setting UI 300 together.

In this case, a user may enable a desired situation setting and a desired 2$^{nd}$ operation setting step to be entered in a manner of dragging & dropping a desired NFC tag to a desired situation setting icon or dragging and dropping a desired situation setting icon to a desired NFC tag.

For instance, if the 1$^{st}$ NFC tag 210 is touched and then dragged & dropped to the time situation setting icon 400 or the time situation setting icon 400 is touched and then dragged & dropped to the 1$^{st}$ NFC tag 210, the controller 180 controls a time setting window and a 2$^{nd}$ operation setting window, which is provided to perform a 2$^{nd}$ operation when the 1$^{st}$ NFC tag 210 is recognized at a time set up via the time setting window, to be displayed within the operation setting window 300.

In the following description, when the time situation setting icon 400 is selected, a process for setting a time and a 2$^{nd}$ operation using the operation setting UI 300 is explained in detail with reference to FIGS. 6 to 9.

Figure 6:
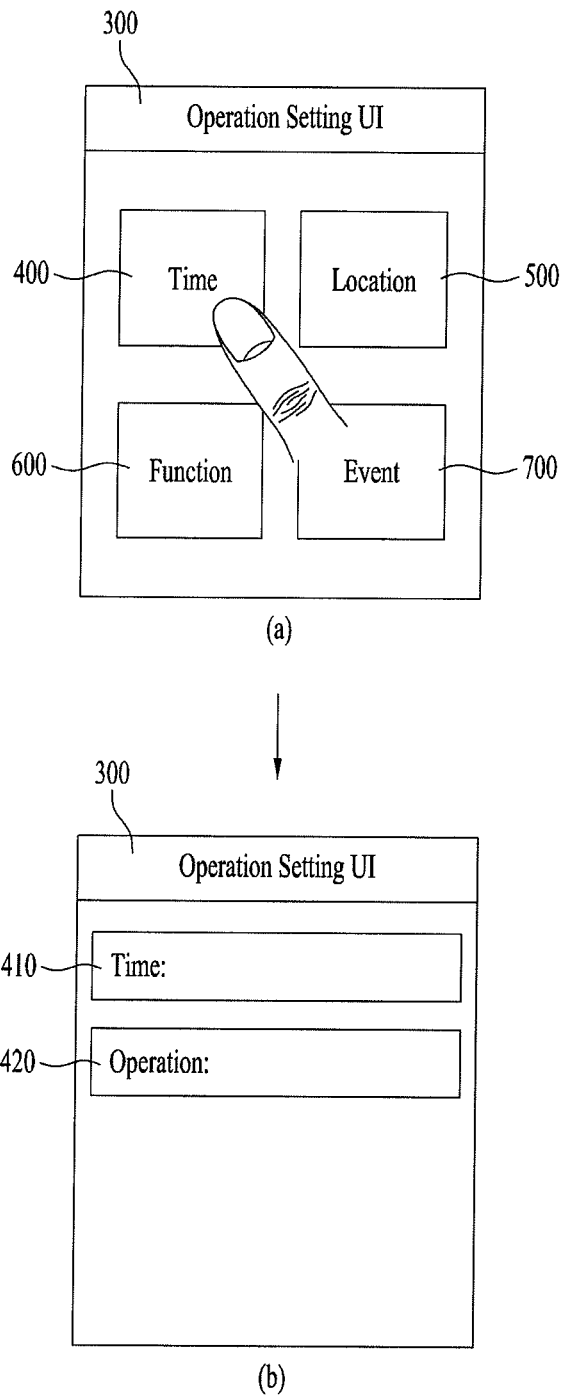

Referring to FIG. 6, if the 1$^{st}$ NFC tag 210 is selected and the time situation setting icon 400 is selected [FIG. 6 (a)], the controller 180 displays a time setting window 410 and a 2$^{nd}$ operation setting window 420 [FIG. 6 (b)].

In particular, referring to FIG. 6 (a), a user may be able to set up a desired time or a desired time slot via the time setting window 410. In more particular, if the time setting window 410 is selected by the user, the controller 180 displays a virtual keypad, which is provided to input a time or a time slot, on the operation setting window 300 and the user is then able to set up the desired time or the desired time slot by the touching the virtual keypad.

Figure 7:
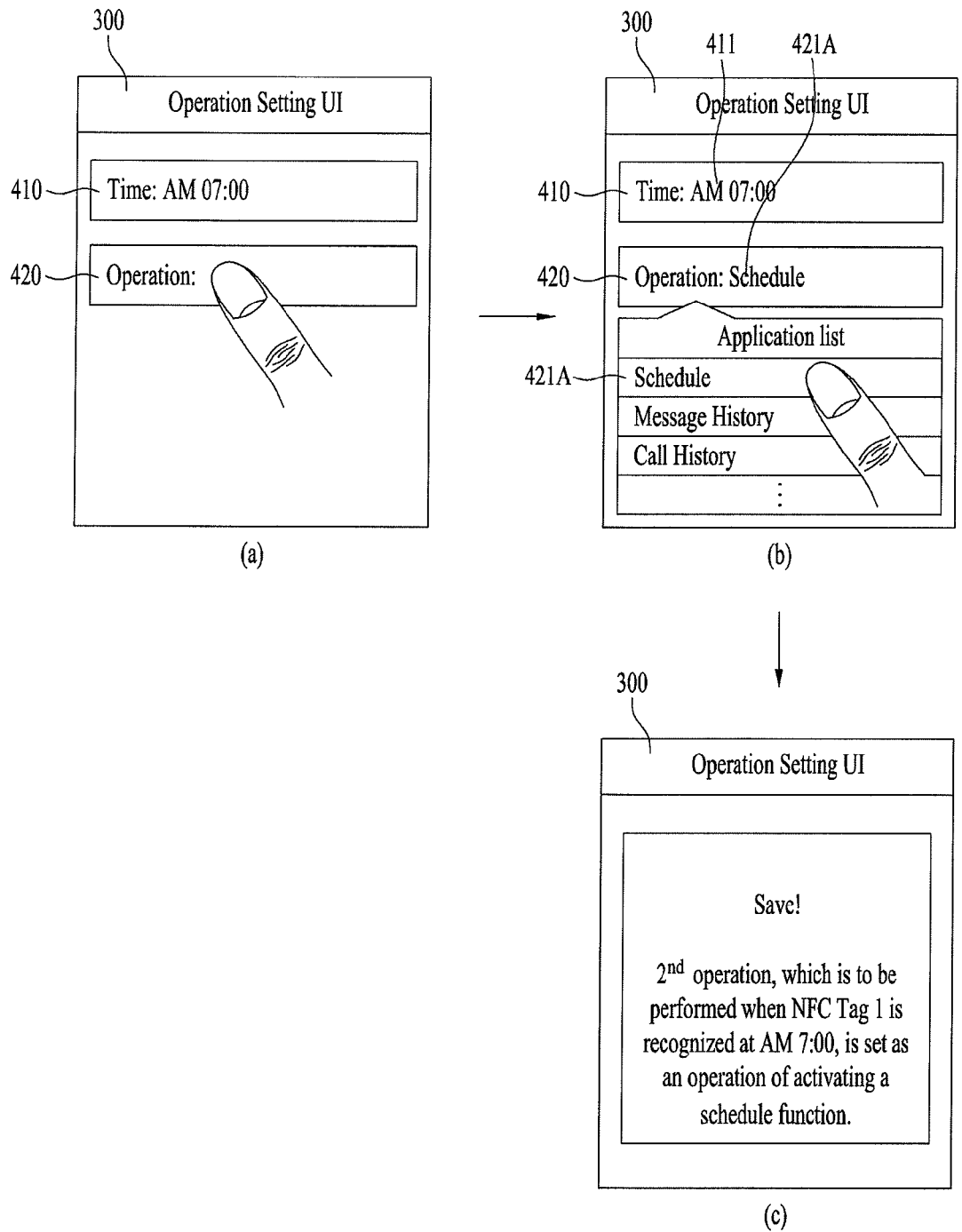

For instance, referring to FIG. 7 (a), 'AM 07:00' 411 is set in the time setting window 410.

Subsequently, if the $2^{nd}$ operation setting window 420 is selected, referring to FIG. 7 (b), the controller 180 displays a list of functions provided to the mobile terminal 100. If a specific function 421A is selected from the list, referring to FIG. 7 (c), the controller 180 maps the 'AM 07:00' and the specific function 421A to each other and then saves them in the memory 160.

For instance, referring to FIG. 7 (b), an application 'Schedule' provided to the mobile terminal 100 is selected as the specific function 421A.

Preferably, since a unique device information of the $1^{st}$ NFC tag 210 and a $1^{st}$ operation, which is performed when the $1^{st}$ NFC tag 210 is recognized in a normal situation, are set in the memory 160, the controller maps the above-set 'AM 07:00' 411 and the function 'Schedule' 421 to each other and then saves the mapped information together with the unique device information of the $1^{st}$ NFC tag 210 and the $1^{st}$ operation.

Thereafter, if the $1^{st}$ NFC tag 210 is recognized at a time different from the above-set 'AM 07:00' 411, the controller 180 performs the $1^{st}$ operation. If the $1^{st}$ NFC tag 210 is recognized at the above-set time 'AM 07:00' 411, the controller 180 activates the function 'Schedule' 421A as the $2^{nd}$ operation.

Figure 8:
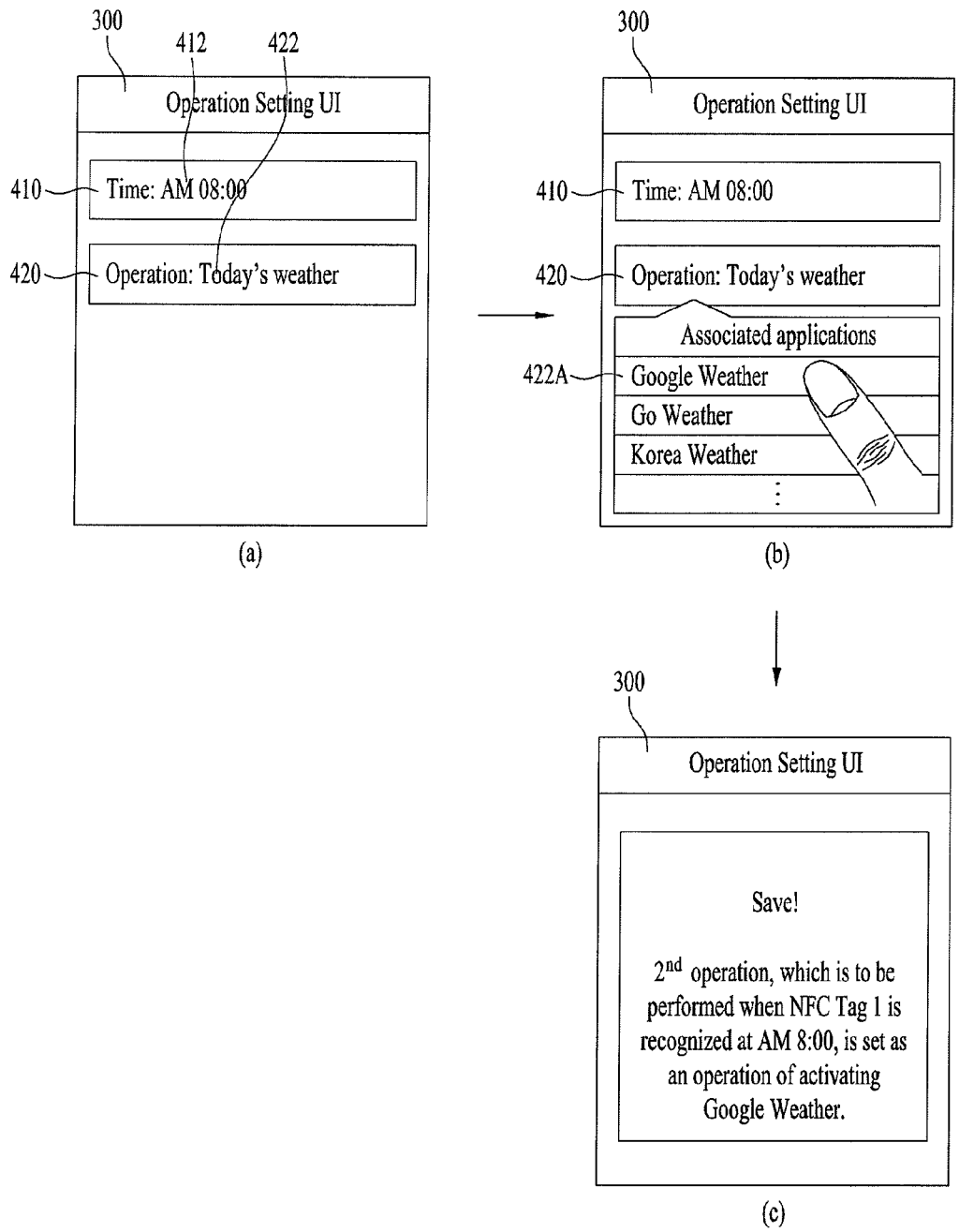

Referring to FIG. 8, if a time 'AM 08:00' 412 is set via the time setting window 410 and a keyword 'Today's weather' 422 corresponding to the $2^{nd}$ operation is inputted via the $2^{nd}$ operation setting window 420 [FIG. 8 (a)], the controller 180 searches the functions provided to the mobile terminal 100 for functions associated with the inputted keyword 'Today's weather' 422 and then displays a list of the found associated functions [FIG. 8 (b)].

In this case, the keyword 422 inputted via the $2^{nd}$ operation setting window 420 may include a text keyword or a voice keyword.

In particular, if the $2^{nd}$ operation setting window 420 is selected, the controller 180 displays a virtual keypad for inputting the keyword 422, whereby a user may be able to input a text corresponding to the desired keyword 422 via the virtual keypad.

If the $2^{nd}$ operation setting window 420 is selected, the controller 122 activates the microphone 122. The user is then able to input a voice corresponding to the desired keyword 422 via the microphone 122. In doing so, the controller 180 recognizes the voice keyword inputted via the microphone 122 as a text using TTS (text to speech) provided as a module to the mobile terminal 100 or as software to the memory 160 and may be then able to recognize the recognized text as the keyword 422.

Meanwhile, the object of the keyword 422 inputted by the user is to be provided with 'Today's weather' via the mobile terminal 100 when the $1^{st}$ NFC tag 210 is recognized at the time 'AM 08:00' 412. Hence, the controller 180 searches the functions provided to the mobile terminal 100 for the functions capable of providing the 'Today's weather' and then controls a list of the found functions to be displayed. Optionally, without the process shown in FIG. 8 (b), the present invention enables a user to directly set up the function of providing the 'Today's weather' among the functions provided to the mobile terminal 100.

In doing so, if at least two function associated with the inputted keyword 422 are found through the search, the controller 180 may control the associated function, which has a highest priority among the found at least two associated functions, to be displayed on the list based on preset priorities, thereby recommending the associated function of the highest priority as the $2^{nd}$ operation to the user. In particular, the user selects the associated function having the highest priority recommended by the mobile terminal 100 and is then able to set the associated function of the highest priority as the $2^{nd}$ operation.

If at least two function associated with the inputted keyword 422 are found through the search, the controller 180 may control the associated functions, which belong to a high priority group among the found at least two associated functions, to be displayed on the list based on preset priorities, thereby recommending the associated functions belonging to the high priority group as the $2^{nd}$ operations to the user. In particular, the user may be able to set and change the number of the functions belonging to the high priority group.

If at least two function associated with the inputted keyword 422 are found through the search, the controller 180 may control the found at least two associated functions to be displayed on the list in a manner of being sorted by the preset priority.

In this case, the priority may be set up by a user and may include one of a user's recent use frequency of the associated functions, an index order of the associated functions, an evaluated point of a corresponding application for providing the associated functions, a priority set up by a user and the like.

For instance, referring to FIG. 8 (b), the priority of each of the associated functions sorted on the list is the user's recent use frequency, the associated functions are sorted on the list in order of the user's recent use frequency, and the associated function 'Google Weather' 422A is the most frequently used function at the present.

Figure 9:
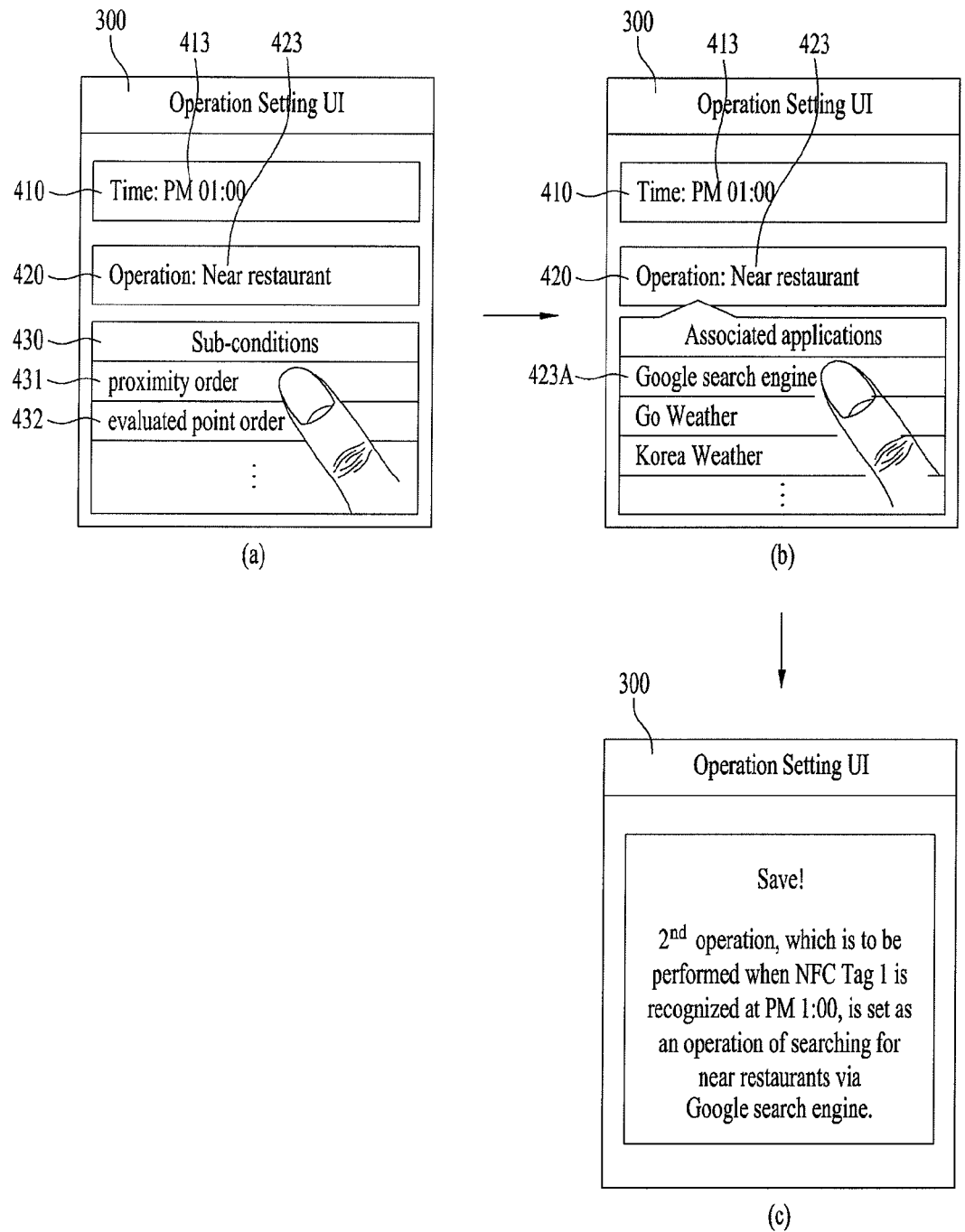

Referring to FIG. 9, if a time 'PM 1:00' 413 is set up via the time setting window 410 and a keyword 'near restaurant' 423 corresponding to the $2^{nd}$ operation is inputted via the $2^{nd}$ operation setting window 420 [FIG. 9 (a)], the controller 180 searches the functions provided to the mobile terminal 100 for the functions associated with the inputted keyword 'near restaurant' 423 and then displays a list of the found associated functions [FIG. 9 (b)].

In particular, the object of the keyword 423 inputted by a user is to be provided with the 'near restaurant' via the mobile terminal 100 when the $1^{st}$ NFC tag 210 is recognized at the time 'PM 1:00'. Hence, the controller 180 searches the functions provided to the mobile terminal 100 for the functions capable of providing the 'near restaurant' and the displays the list of the found functions. Optionally, without the process shown in FIG. 9 (b), the present invention enables a user to directly set up the function of providing the 'near restaurant' among the functions provided to the mobile terminal 100.

In doing so, if at least two function associated with the inputted keyword 423 are found through the search, the controller 180 may control the associated function, which has a highest priority among the found at least two associated functions, to be displayed on the list based on preset priorities, thereby recommending the associated function of the highest priority as the $2^{nd}$ operation to the user. In particular, the user selects the associated function having the highest priority recommended by the mobile terminal 100 and is then able to set the associated function of the highest priority as the $2^{nd}$ operation.

If at least two function associated with the inputted keyword 423 are found through the search, the controller 180 may control the associated functions, which belong to a high priority group among the found at least two associated functions, to be displayed on the list based on preset priorities, thereby recommending the associated functions belonging to the high priority group as the $2^{nd}$ operations to the user. In particular, the user may be able to set and change the number of the functions belonging to the high priority group.

If at least two function associated with the inputted keyword 423 are found through the search, the controller 180 may control the found at least two associated functions to be displayed on the list in a manner of being sorted by the preset priority.

In this case, the priority may be set up by a user and may include one of a user's recent use frequency of the associated functions, an index order of the associated functions, an evaluated point of a corresponding application for providing the associated functions, a priority set up by a user and the like.

If a specific associated function 'Google search engine' 423A is selected from the list [FIG. 9 (b)], the controller 180 saves the time 413 and the selected associated function 413A in the memory 160 [FIG. 9 (c)].

In the above description, the process for setting the time and the $2^{nd}$ operation via the time situation setting icon 400 is explained in detail with reference to FIGS. 6 to 9.

The $2^{nd}$ operation is non-limited by the operations described with reference to FIGS. 6 to 9 and the following operations and may include all functions and environment configuring operations, which are providable by or available for the mobile terminal.

In the following description, when the location situation setting icon 500 is selected, a process for setting a location and a $2^{nd}$ operation using the operation setting UI 300 is explained in detail with reference to FIGS. 10 to 12.

Figure 10:
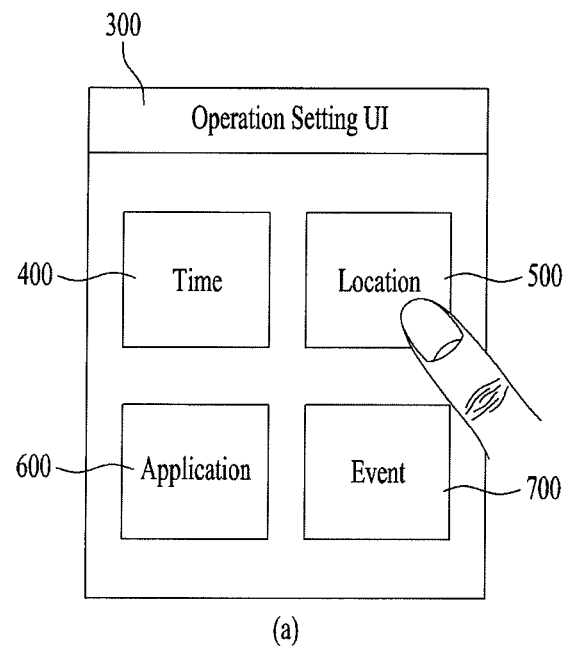
Figure 10:
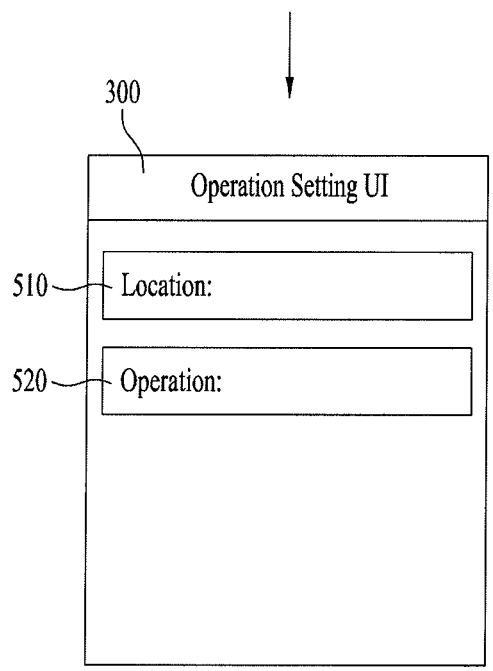

Referring to FIG. 10, if the $1^{st}$ NFC tag 210 is selected and the location situation setting icon 500 is selected [FIG. 10 (a)], the controller 180 displays a location setting window 510 and a $2^{nd}$ operation setting window 520 [FIG. 10 (b)].

In particular, referring to FIG. 10 (a), a user may be able to set up a desired location via the location setting window 510. In more particular, if the location setting window 510 is selected by the user, the controller 180 displays a virtual keypad for a location search on the operation setting window 300. If a keyword for the location search is inputted via the virtual keypad, the controller 180 searches for a location information corresponding to the keyword via a web search engine provided to the mobile terminal 100 or a preset website and is then able to set the found location information as the user situation. Alternatively, the user may be able to directly input an address corresponding to the desired location via the virtual keypad.

Figure 11:
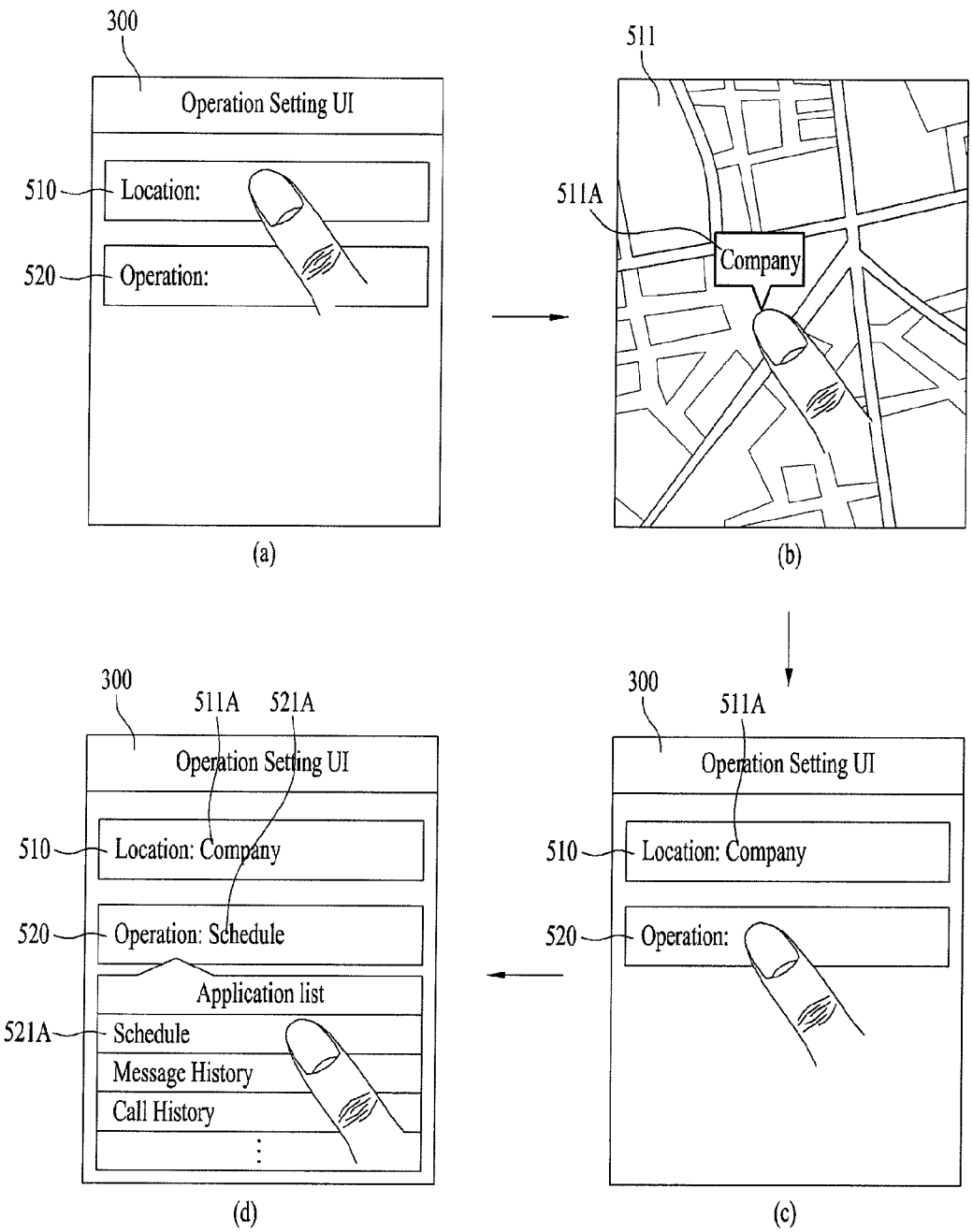

Referring to FIG. 11, if the location setting window 510 is selected [FIG. 11 (a)], the controller 180 displays a map 511 provided to the mobile terminal 100 [FIG. 11 (b)]. The map here and in other examples for selecting or identifying a location/destination can be a map centered around the current location of the mobile terminal, a map of an area pre-designed by the user or the mobile terminal, a map of an area associated with a particular location or address stored in the mobile terminal (e.g., in the Contact or Address book), etc. This map can be manipulated by the user using known techniques. For instance, the map can be zoomed in and out and extended to different directions based on the user input, such as touch inputs. If the location setting window 510 is selected by the user, the controller 180 can display a virtual keypad or menu for a location search or entry of a specific location on the operation setting window 300. If a keyword for the location search or a specific location is entered to the menu, the controller 180 then displays a map of the searched location or specific location, which can be the map 511.

If a specific location 511A is selected from the map 511, the controller 180 may be able to set a location information corresponding to the selected specific location 511A as the user situation. In doing so, if the specific location 511A is selected, the controller 180 may display a virtual keypad for a name input of the selected specific location 511A. The user may be then able to set up a name of the selected specific location 511A via the virtual keypad.

For instance, referring to FIG. 11 (b), the name of the specific location 511A selected by the user is set to 'company'.

If the $2^{nd}$ operation setting window 520 is selected [FIG. 11 (c)], the controller 180 displays a list of the functions provided to the mobile terminal 100. If a specific function 521A is selected from the list, the controller 180 maps the set 'company' location 511A and the specific function 521A to each other and then saves them in the memory 160 [FIG. 11 (d)].

For instance, referring to FIG. 11 (d), an application 'Schedule' provided to the mobile terminal 100 is selected as the specific function 521A.

Meanwhile, the list may include at least two functions most frequently used at present among all the functions provided to the mobile terminal. In particular, the controller 180 periodically acquires and saves use frequencies of the functions provided to the mobile terminal 100. If the $2^{nd}$ operation setting window 520 is selected, the controller 180 provides the user with the list including the at least two functions most frequently used at present based on the periodically acquired use frequencies.

The list may include functions used at the location 'company' 512A among all the functions provided to the mobile terminal 100. In particular, the controller 180 periodically acquires and saves the locations, at which the functions provided to the mobile terminal 100 were used, via the position location module 115 each time the functions are used, respectively. After the location 'company' 512A has been set up, if the $2^{nd}$ operation setting window 520 is selected, the controller 180 provides the list, in which the functions used at the location 'company' 512A among the functions of the mobile terminal 100 are included, to the user.

The list may include functions used at the location 'company' 512A among all the functions provided to the mobile terminal 100. In particular, after the location 'company' 512A has been set up, if the $2^{nd}$ operation setting window 520 is selected, the controller 180 provides the list, in which the functions associated with the location 'company' 512A are included among the functions of the mobile terminal 10, to the user.

Thereafter, if the $1^{st}$ NFC tag 210 is recognized at a location different from the set location 'company' 512A, the controller 180 performs the $1^{st}$ operation. If the $1^{st}$ NFC tag 210 is recognized at the set location 'company' 512A, the controller 180 activates the function 'Schedule' 521A as the $2^{nd}$ operation.

Figure 12:
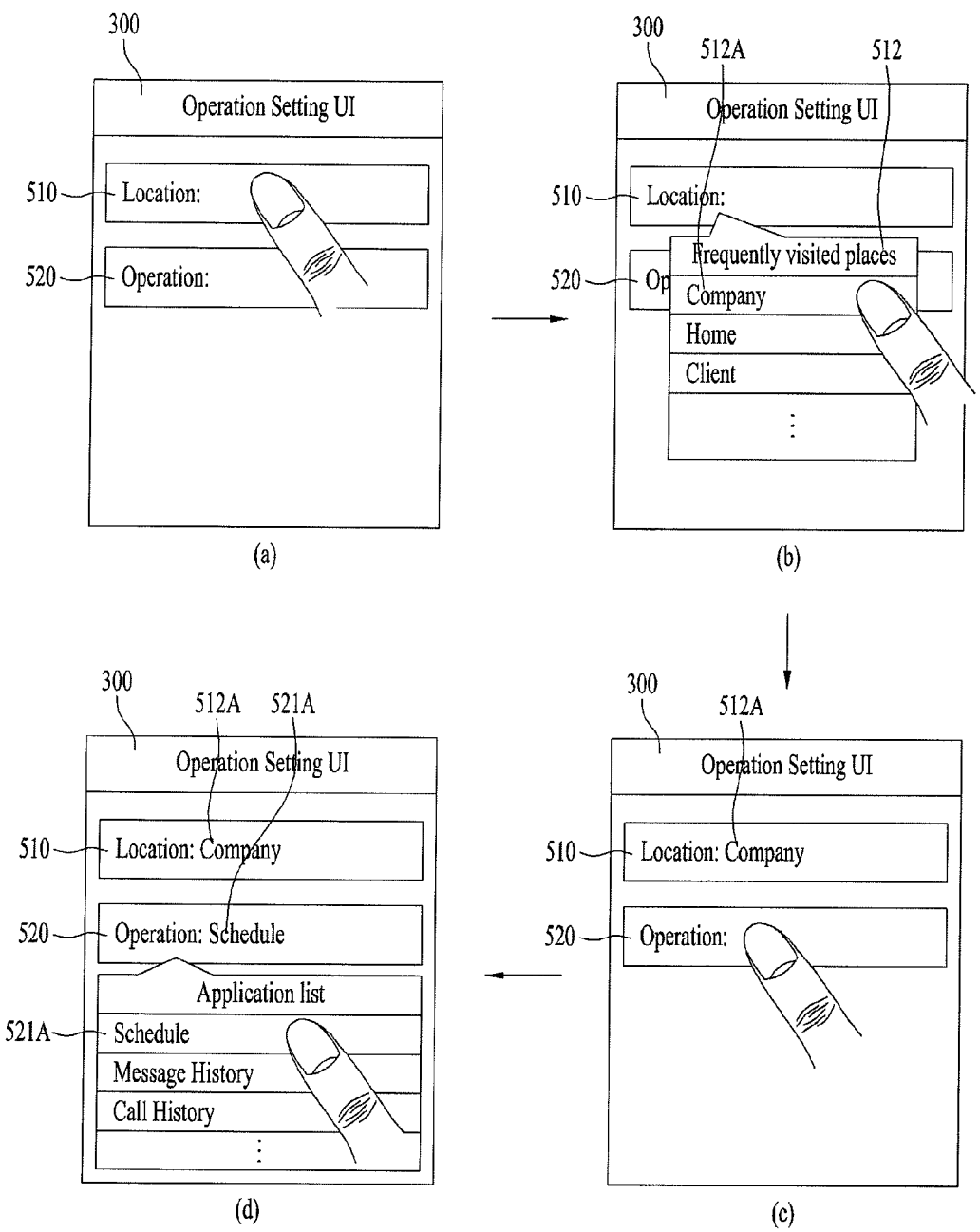

Referring to FIG. 12, if the location setting window 510 is selected [FIG. 12 (a)], the controller 180 displays a list 512, in which frequently visited locations (or places) are included, [FIG. 12 (b)].

In particular, if a user inputs a name and location information of a frequently visited location (e.g., the map shown in FIG. 11 (b) may be available for this input), the controller 180 saves the inputted name and location information in the memory 160. If the location setting window 510 is selected, the controller 180 may be then able to display the list containing the frequently visited locations.

Each time a location of the mobile terminal 100 is shifted, the controller 180 periodically acquires and saves the shifted location via the position location module 115. If the number of visits paid to the saved location by the mobile terminal 100 is equal to or greater than a preset count, the controller 180 determines the saved location as a frequently visited location, acquires a location information on the frequently visited location, and then saves the acquired location information. If the location setting window 510 is selected, the controller 180 may be able to display the list 512 containing the frequently visited locations.

If a specific location 'company' 512A is selected from the list 512, the controller 180 sets the selected specific location 'company' 512A as the user situation. If the $2^{nd}$ operation setting window 520 is selected [FIG. 12 (c)], the controller 180 displays the list of the functions provided to the mobile terminal 100. If a specific function 521A is selected from the list, the controller 180 maps the set location 'company' 512A and the specific function 521A to each other and then saves them in the memory 160.

Meanwhile, the location situation setting icon 500 may be able to further provide a destination location setting.

In the above description, the process for setting the location and the $2^{nd}$ operation via the time situation setting icon 400 is explained in detail with reference to FIGS. 10 to 12.

The $2^{nd}$ operation is non-limited by the operations described with reference to FIGS. 10 to 12 and the following operations and may include all functions and environment configuring operations, which are providable by or available for the mobile terminal.

In the following description, when the location situation setting icon 500 is selected, a process for setting a destination location and a $2^{nd}$ operation using the operation setting UI 300 is explained in detail with reference to FIGS. 13 to 15.

Figure 13:
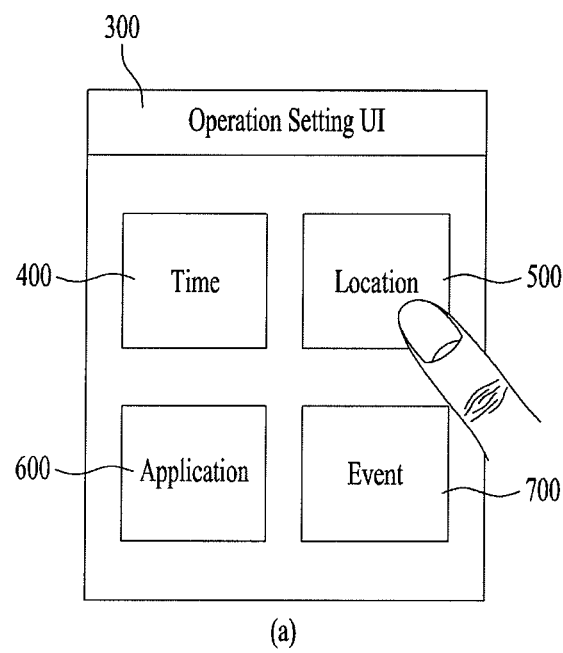
Figure 13:
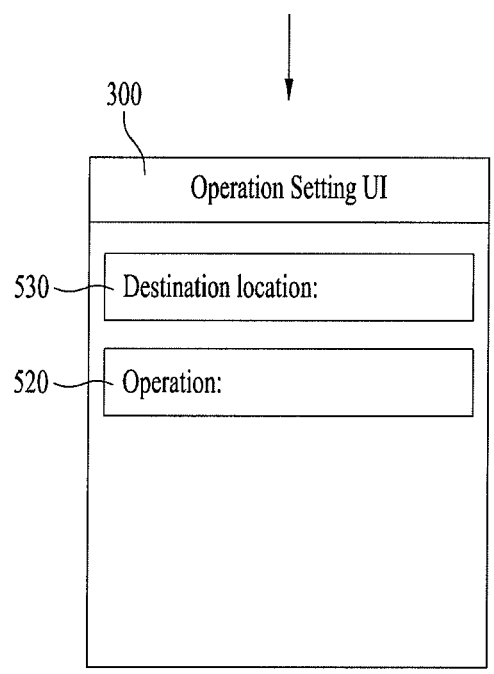

Referring to FIG. 13, if the $1^{st}$ NFC tag 210 is selected and the location situation setting icon 500 is selected [FIG. 13 (a)], the controller 180 displays a destination location setting window 530 and a $2^{nd}$ operation setting window 520 [FIG. 13 (b)].

In particular, referring to FIG. 13 (a), a user may be able to set up a desired destination location via the destination location setting window 510. In more particular, if the destination location setting window 530 is selected by the user, the controller 180 displays a virtual keypad for a destination location search on the operation setting window 300. If a keyword for the destination location search is inputted via the virtual keypad, the controller 180 searches for a destination location information corresponding to the keyword via a web search engine provided to the mobile terminal 100 or a preset website and is then able to set the found destination location information as the user situation. Alternatively, the user may be able to directly input an address corresponding to the desired destination location via the virtual keypad.

Figure 14:
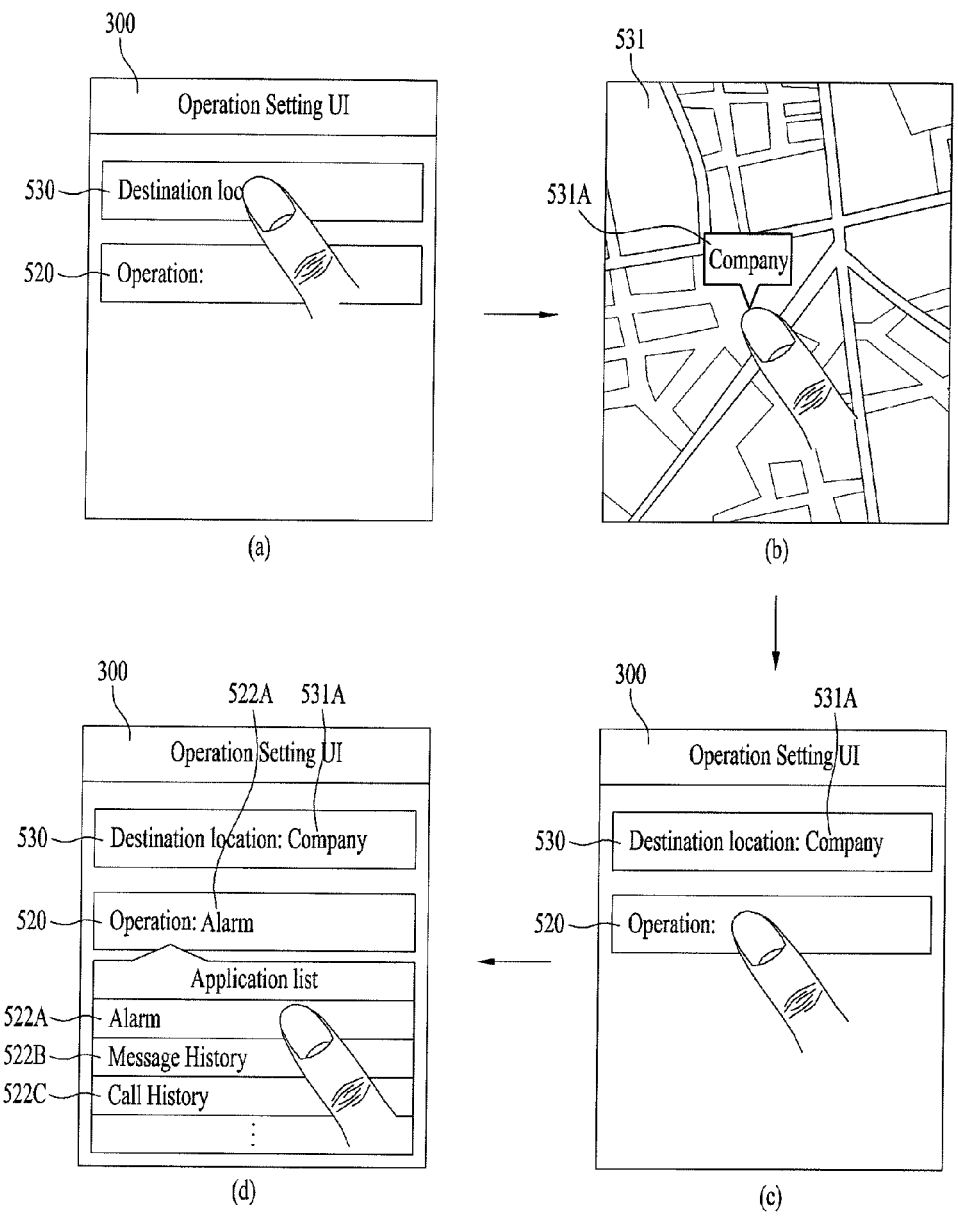

Referring to FIG. 14, if the destination location setting window 530 is selected [FIG. 14 (a)], the controller 180 displays a map 531 provided to the mobile terminal 100 [FIG. 14 (b)]. If a specific destination location 513A is selected from the map 531, the controller 180 may be able to set a destination location information corresponding to the selected specific destination location 531A as the user situation. In doing so, if the specific destination location 531A is selected, the controller 180 may display a virtual keypad for a name input of the selected specific destination location 531A. The user may be then able to set up a name of the selected specific destination location 531A via the virtual keypad.

For instance, referring to FIG. 14 (b), the name of the specific destination location 531A selected by the user is set to 'company'.

If the $2^{nd}$ operation setting window 520 [FIG. 14 (c)], the controller 180 displays a list of the functions provided to the mobile terminal 100. If a specific function 'Alarm' 522A is selected form the list, the controller 180 maps the set 'company' destination location 531A and the specific function 522A to each other and then saves them in the memory 160 [FIG. 14 (d)].

For instance, referring to FIG. 14 (d), an application 'Alarm' provided to the mobile terminal 100 is selected as the specific function 522A.

In doing so, if the application 'Alarm' 522A is selected, the controller 180 activates the application 'Alarm' 522A. After the $1^{st}$ NFC tag 210 has been recognized, if a location of the mobile terminal 100 arrives at the destination location 'company' 531A, the controller 180 may receive a setting of an alarm type, which is to indicate the arrival, from a user via the application 'Alarm' 522A.

In particular, After the 1" NFC tag 210 has been recognized, if a location of the mobile terminal 100 arrives at the destination location 'company' 531A, the application 'Alarm' 522A provides a function of setting audio, display and the like to indicate the arrival.

For instance, the user may be able to set up an audio (e.g., alarm sound, music, voice, etc.) to indicate the arrival at the destination location 'company' 531A via the application 'Alarm' 522A. And, the user may be able to set up a text, an image, a video, a display brightness and the like to indicate the arrival at the destination location 'company' 531A.

Subsequently, after the 1" NFC tag 210 has been recognized, if a location of the mobile terminal 100 arrives at the destination location 'company' 531A, the controller 180 activates the application 'Alarm' 522A and then indicates that the location of the mobile terminal 100 has arrived at the destination location 'company' 531A by the alarm type set by the user.

Meanwhile, the list may include at least two functions most frequently used at present among all the functions provided to the mobile terminal 100. In particular, the controller 180 periodically acquires and saves use frequencies of the functions provided to the mobile terminal 100. If the $2^{nd}$ operation setting window 520 is selected, the controller 180 provides the user with the list including the at least two functions most frequently used at present based on the periodically acquired use frequencies.

The list may include functions used at the destination location 'company' 531A among all the functions provided to the mobile terminal 100. In particular, the controller 180 periodically acquires and saves the locations, at which the functions provided to the mobile terminal 100 were used, via the position location module 115 each time the functions are used, respectively. After the destination location 'company' 531A has been set up, if the $2^{nd}$ operation setting window 520 is selected, the controller 180 provides the list, in which the functions associated with the destination location 'company' 531A among the functions of the mobile terminal 100 are included, to the user.

Thereafter, if the $1^{st}$ NFC tag 210 is recognized, the controller 180 periodically acquires a current location of the mobile terminal 100 via the position location module 115. The controller 180 performs the $1^{st}$ operation until the current location of the mobile terminal 100 arrives at the destination location 'company' 531A. If the current location of the mobile terminal 100 arrives at the destination location 'company' 531A, the controller 180 activates the function 'Alarm' as the $2^{nd}$ operation.

Figure 15:
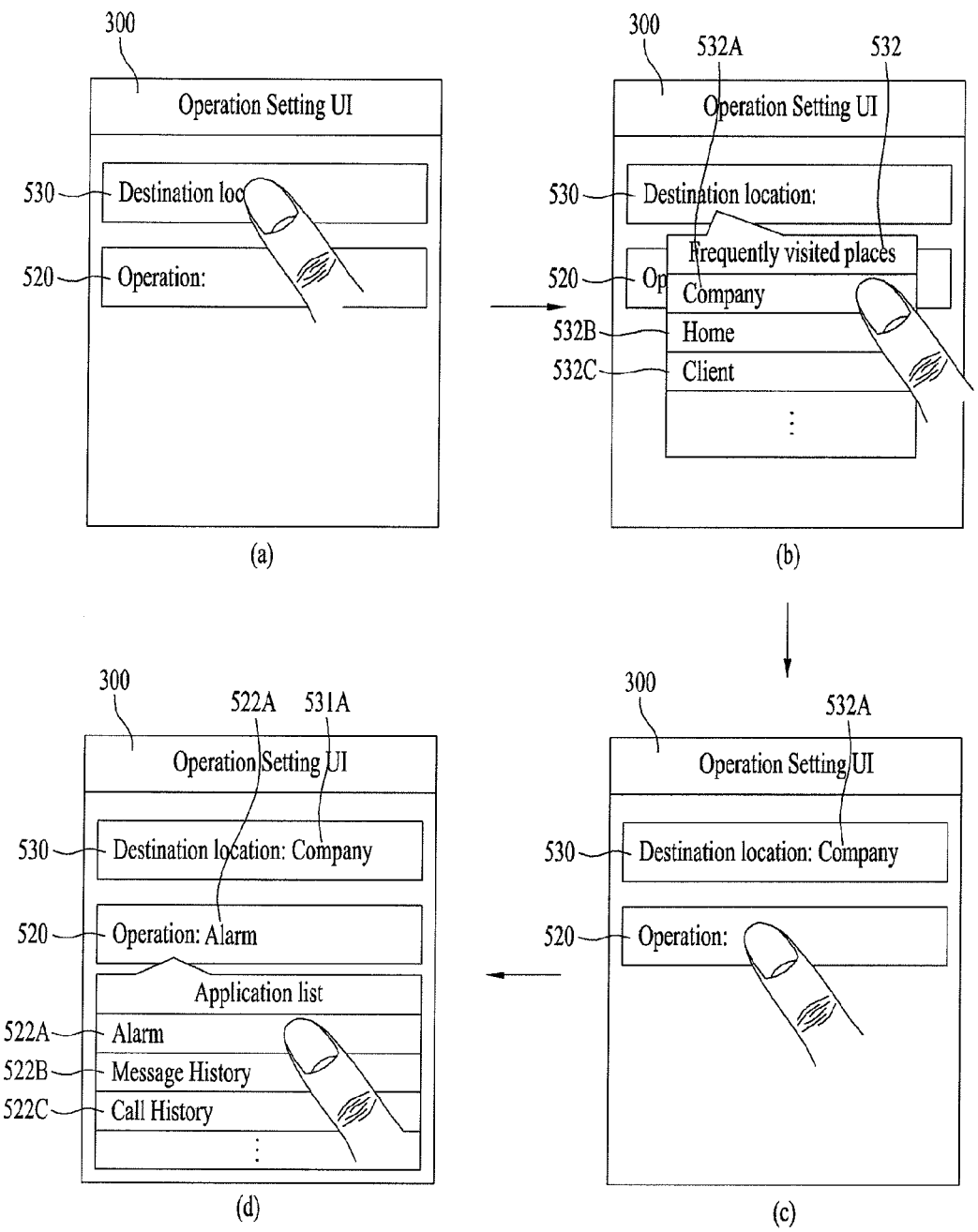

Referring to FIG. 15, if the location setting window 510 is selected [FIG. 15 (a)], the controller 180 displays a list 532, in which frequently visited destination locations (or places) are included, [FIG. 15 (b)].

In particular, if a user inputs a name and location information of a frequently visited destination location (e.g., the map shown in FIG. 14 (b) may be available for this input), the controller 180 saves the inputted name and destination location information in the memory 160. If the location setting window 510 is selected, the controller 180 may be then able to display the list containing the frequently visited destination locations.

Each time the mobile terminal 100 is shifted to a specific destination location, the controller 180 periodically acquires and saves the shifted destination location via the position location module 115. If the number of visits paid to the saved destination location by the mobile terminal 100 is equal to or greater than a preset count, the controller 180 determines the saved destination location as a frequently visited destination location, acquires a location information on the frequently visited destination location, and then saves the acquired location information on the destination location. If the location setting window 510 is selected, the controller 180 may be able to display the list 532 containing the frequently visited destination locations.

If a specific destination location 'company' 532A is selected from the list 532, the controller 180 sets the selected specific destination location 'company' 532A as the user situation. If the $2^{nd}$ operation setting window 520 is selected [FIG. 15 (c)], the controller 180 displays the list of the functions provided to the mobile terminal 100. If a specific function 522A is selected from the list, the controller 180 maps the set destination location 'company' 522A and the specific function 522A to each other and then saves them in the memory 160.

Meanwhile, for another instance, the controller 180 may control a destination location 'theater' to be set via the destination location setting window 530 and may control 'mute/manner mode' to be set as the $2^{nd}$ operation via the $2^{nd}$ operation setting window 520 [not shown in FIGS. 13 to 15].

In this case, after the $1^{st}$ NFC tag 210 has been recognized, the controller 180 may control the mobile terminal 100 to perform the $1^{st}$ operation until arriving at the destination location 'theater'. Once the mobile terminal 100 arrives at the destination location 'theater', the controller 180 may control an indication mode of the mobile terminal 100 to be switched to 'mute/manner mode' from previous 'bell sound mode' as the $2^{nd}$ operation.

For another instance, the controller 180 may control a destination location 'school' to be set via the destination location setting window 530 and may control 'message transmission' to be set as the $2^{nd}$ operation via the $2^{nd}$ operation setting window 520 [not shown in FIGS. 13 to 15].

In this case, assume that the mobile terminal 100 may be a device owned by a child and that the message may be transmitted to a mobile terminal phone number of a parent.

In particular, after the $1^{st}$ NFC tag 210 has been recognized, the controller 180 may control the mobile terminal 100 to perform the $1^{st}$ operation until arriving at the destination location 'school'. Once the mobile terminal 100 arrives at the destination location 'school', the controller 180 may control a message indicating the arrival at the 'school' to be sent to the phone number of the mobile terminal of the parent as the $2^{nd}$ operation.

In the above description, the process for setting the destination location and the $2^{nd}$ operation via the location situation setting icon 500 is explained in detail with reference to FIGS. 13 to 15.

The $2^{nd}$ operation is non-limited by the operations described with reference to FIGS. 13 to 15 and the following operations and may include all functions and environment configuring operations, which are providable by or available for the mobile terminal.

In the following description, when the function situation setting icon 600 is selected, a process for setting a function and a $2^{nd}$ operation using the operation setting UI 300 is explained in detail with reference to FIGS. 16 to 19.

Figure 16:
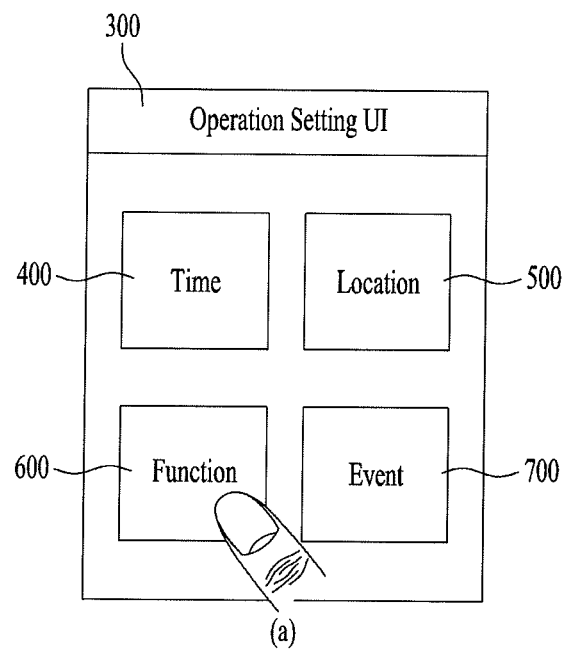
Figure 16:
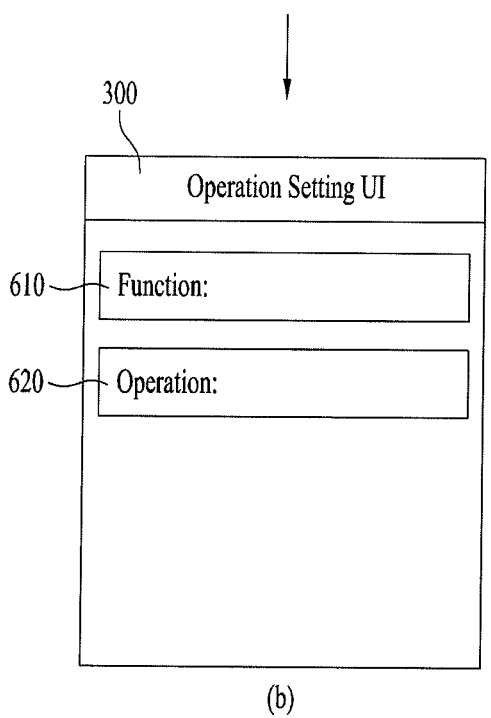

Referring to FIG. 16, if the $1^{st}$ NFC tag 210 is selected and the function situation setting icon 600 is selected [FIG. 16 (a)], the controller 180 displays a function setting window 610 and a $2^{nd}$ operation setting window 620 [FIG. 16 (b)].

Figure 17:
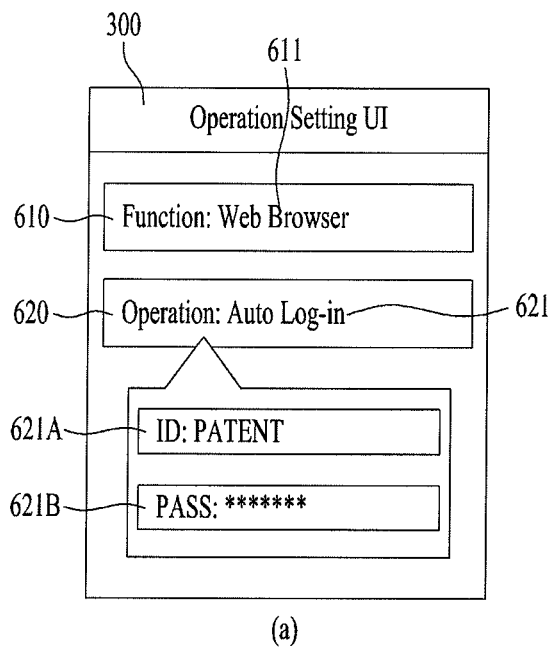
Figure 17:
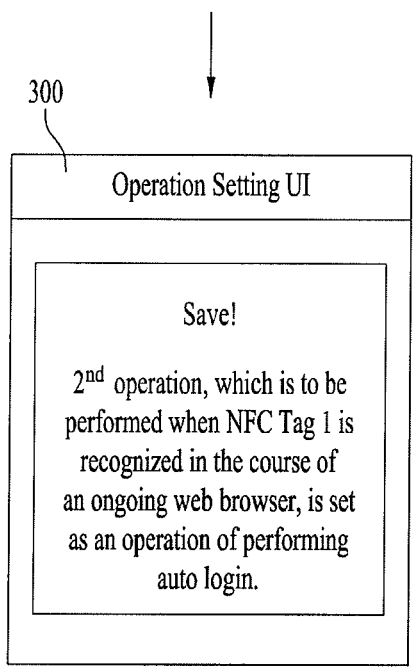

In particular, referring to FIG. 17 (a), a user may be able to set up a desired function via the function setting window 610. In more particular, if the function setting window 610 is selected by the user, the controller 180 displays a list of the functions provided to the mobile terminal 100 and may be then able to control a specific function 'Web Browser' 611, which is selected from the list, to be set as a user situation.

In this case, the functions provided to the mobile terminal 100 may include such all kinds of functions, which can be used, manipulated or provided by the mobile terminal 100, and can be applications, widgets, menus, environment configurations and the like which can provide specific function(s).

Subsequently, if the $2^{nd}$ operation setting window 620 is selected, the controller 180 displays a list of the functions provided to the mobile terminal 100 except the 'Web Browser' 611 and may be then able to control an executed operation of another specific function, which is selected from the list, to be set as the $2^{nd}$ operation.

Referring to FIG. 17 (a), if the $2^{nd}$ operation setting window 620 is selected, the controller 180 displays a list of sub-functions belonging to the 'Web Browser' 611. If a specific sub-function 'Auto Login' 621 is selected from the sub-function list, the controller 180 may be able to set an activation of the selected specific sub-function 'Auto Login' as the $2^{nd}$ operation.

For instance, FIG. 17 (a) shows that the sub-function is the auto login function 621 for the 'Web Browser' 611. In this case, if the auto login function 621 is selected from the sub-function list, the controller 180 displays a login setting window. If a user ID 621A and a password 621B are inputted via the login setting window, referring to FIG. 17 (b), the controller 180 controls the inputted user ID 621A and the inputted password 621B to be saved.

If the $1^{st}$ NFC tag 210 is recognized in a situation that the 'Web Browser' 611 is not activated, the controller 180 controls the $1^{st}$ operation to be performed. If the $1^{st}$ NFC tag 210 is recognized in a situation that the 'Web Browser' 611 is activated, the controller 180 controls a login action to the 'Web Browser' 611 to be automatically performed using the saved user ID and password 621A and 621B.

Figure 18:
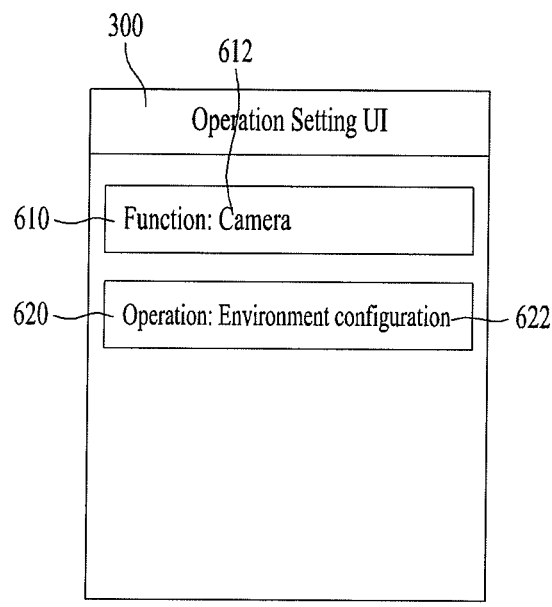
Figure 18:
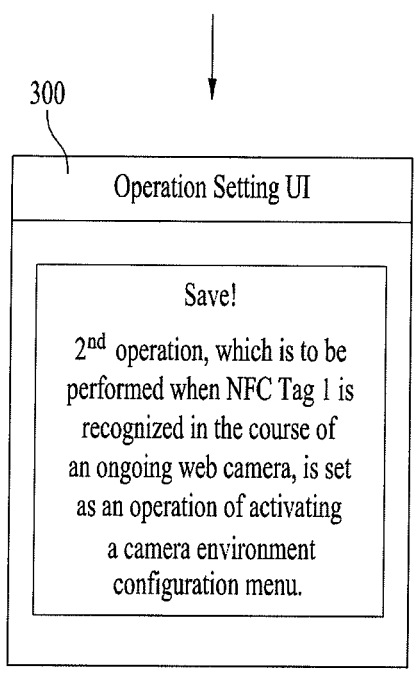

Referring to FIG. 18 (a), if a function 'camera' 612 is set up via the function setting window 610 and a function 'environment configuration menu' 622 of a camera belonging to the function 'camera' 612 is set up via the $2^{nd}$ operation setting window 620, the controller 180 controls the set function 'camera' 612 and the set function 'environment configuration menu' 622 to be saved in the memory 160.

If the 1st NFC tag 210 is recognized in a situation that the function 'camera' 612 is not activated, the controller 180 controls the 1st operation to be performed. If the 1st NFC tag 210 is recognized in a situation that the function 'camera' 612 is activated, the controller 180 controls the function 'environment configuration menu' 622a of the camera to be displayed as the 2nd operation.

In this case, the function 'environment configuration menu' 622 of the camera is the menu for setting photographing conditions of the camera and may include a self-photographing, flash settings, photographing mode settings, exposure values, effects, ISO settings and the like.

Figure 19:
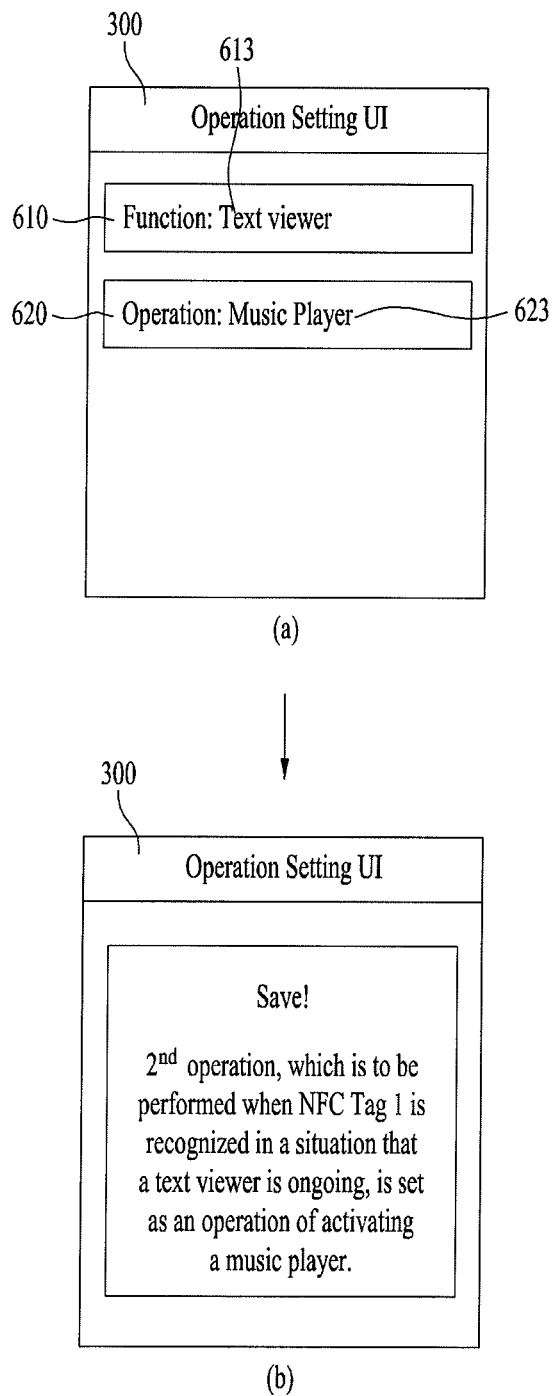

Referring to FIG. 19 (a), if a function 'text viewer' 613 is set up via the function setting window 610 and a function 'music player' 623 is set up via the 2nd operation setting window 620, the controller 180 controls the set function 'text viewer' 613 and the set function 'music player' 623 to be saved in the memory 160.

If the 1st NFC tag 210 is recognized in a situation that the function 'text viewer' 613 is not activated, the controller 180 controls the 1st operation to be performed. If the 1st NFC tag 210 is recognized in a situation that the function 'text viewer' 613 is activated, the controller 180 controls the function 'music player' 623 to be activated as the 2nd operation.

In the above description, the process for setting the function and the 2nd operation via the function situation setting icon 600 is explained in detail with reference to FIGS. 16 to 19.

The 2nd operation is non-limited by the operations described with reference to FIGS. 16 to 19 and the following operations and may include all functions and environment configuring operations, which are providable by or available for the mobile terminal.

In the following description, when the event situation setting icon 700 is selected, a process for setting an event and a 2nd operation using the operation setting UI 300 is explained in detail with reference to FIGS. 20 to 23.

Figure 20:
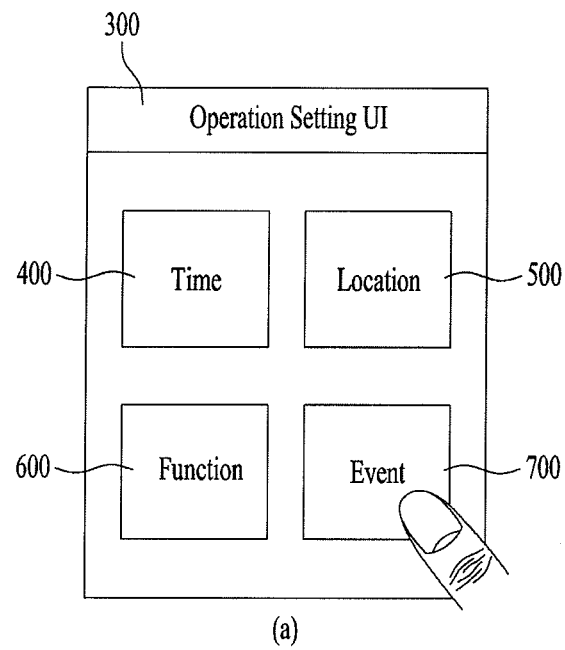
Figure 20:
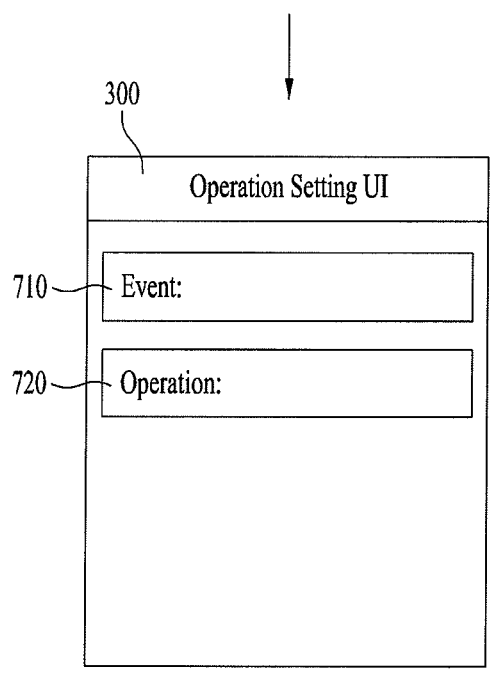

Referring to FIG. 20, if the 1st NFC tag 210 is selected and the event situation setting icon 700 is selected [FIG. 20 (a)], the controller 180 displays an event setting window 710 and a 2nd operation setting window 720 [FIG. 20 (b)].

In this case, events possible to occur in the mobile terminal 100 may include a message reception and a call reception.

Figure 21:
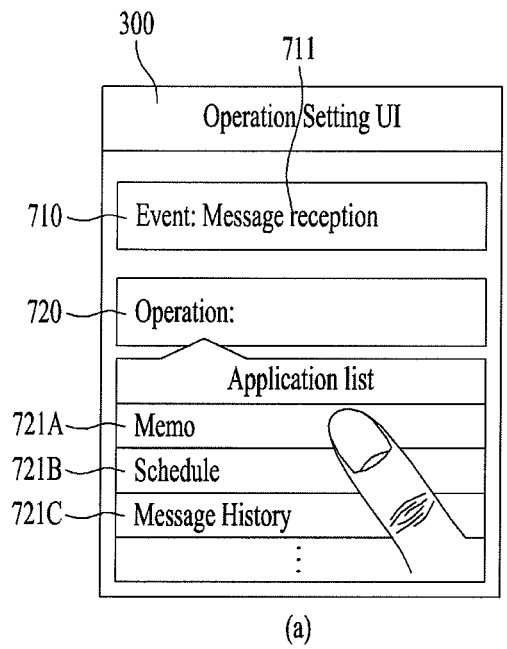
Figure 21:
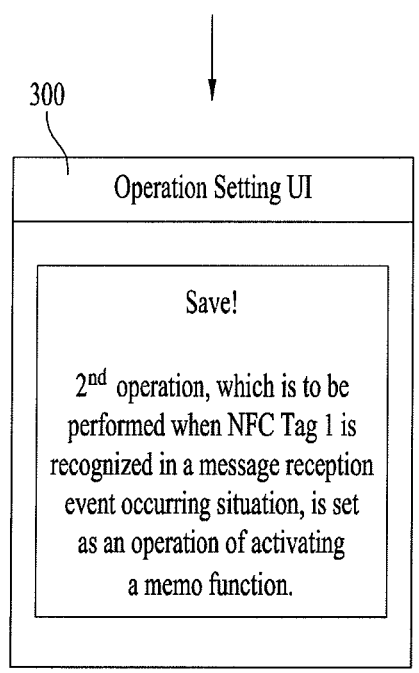

In particular, referring to FIG. 21 (a), a user may be able to set up a type of an event via the event setting window 710. In more particular, if a user selects the event setting window 710, the controller 180 displays a list of event types possible to occur in the mobile terminal 100. And, the controller 180 may control an event 'message reception' 711, which is selected from the list) to be set as a user situation.

For instance, FIG. 21 (a) shows that the event selected from the list is the event 'message reception' 711.

Subsequently, if the 2nd operation setting window 720 is selected, the controller 180 displays a list of the functions provided to the mobile terminal 100 and then controls an activated operation of a specific function 721A selected from the list as the 2nd operation.

In particular, referring to FIG. 21 (b), if the event 'message reception' 711 is set via the event setting window 710 and the function 'Memo' 721A is set via the 2nd operation setting window 720, the controller 180 controls the set event 'message reception' 711 and the set function 'Memo' 721A to be saved in the memory 160.

Thereafter, if the 1st NFC tag 210 is recognized in a situation that the event 'message reception' 711 does not occur, the controller 180 performs the 1st operation. If the 1st NFC tag 210 is recognized in a situation that the event 'message reception' 711 occurs, the controller activates the function 'Memo' 721A as the 2nd operation.

Figure 22:
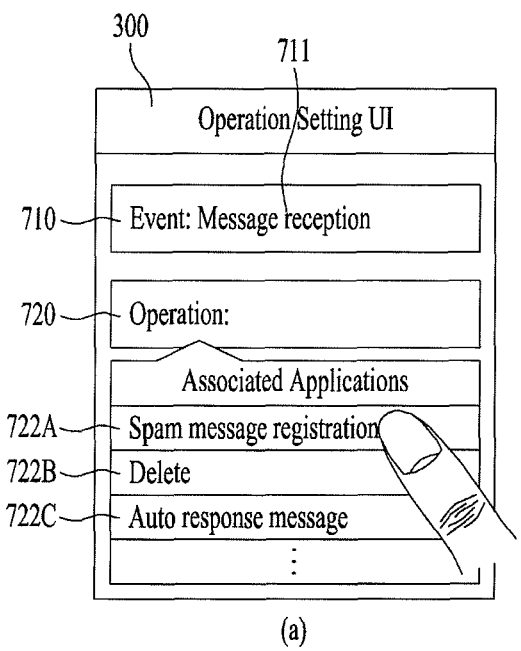
Figure 22:
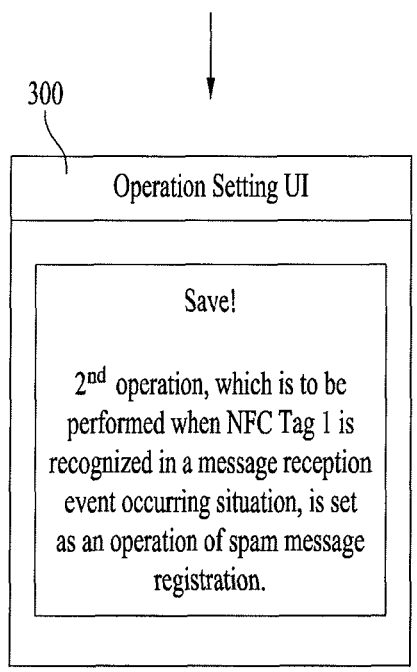

Referring to FIG. 22 (a), if the 2nd operation setting window 720 is selected, the controller 180 displays a list of functions 722A, 722B and 722C, which are associated with the event 'message reception' 711 among the functions provided to the mobile terminal 100. Referring to FIG. 22 (b), if a specific associated function 'spam message registration' 722A is selected from the list, the controller 180 may control an activation of the selected specific associated function 'spam message registration' 722A to be set as the 2nd operation.

For instance, FIG. 22 (a) shows that the associated function is the function 'spam message registration' 722A. In this case, if the 1st NFC tag 210 is recognized in a situation that the event 'message reception' 711 does not occur, the controller 180 may perform the 1st operation. If the 1st NFC tag 210 is recognized in a situation that the event 'message reception' 711 occurs, the controller 180 may perform the 2nd operation in a manner of activating the function 'spam message registration' 722A and registering the received message as a spam message.

Figure 23:
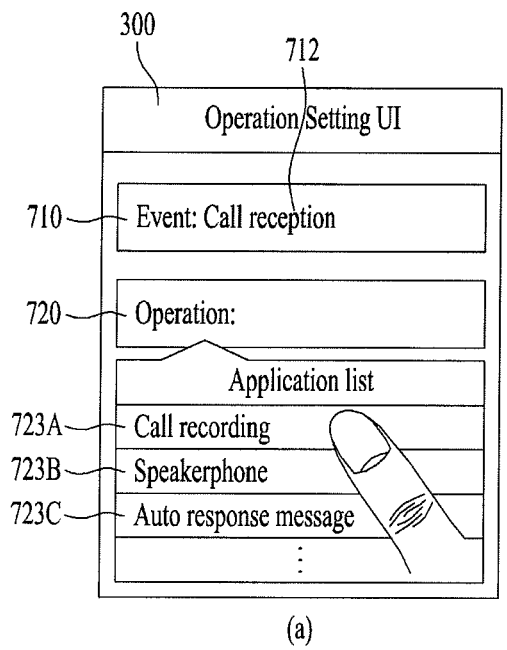
Figure 23:
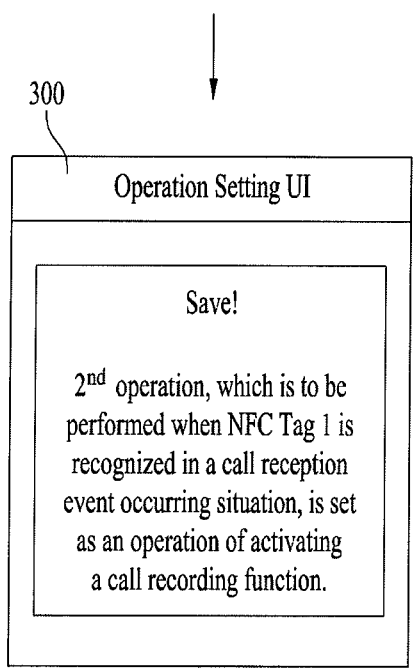

Referring to FIG. 23 (a), if the event 'call reception' 712 is selected via the event setting window 710 and the 2nd operation setting window 720 is selected, the controller 180 displays a list of functions 723A, 723B and 723C, which are associated with the event 'call reception' 712 among the functions provided to the mobile terminal 100. Referring to FIG. 23 (b), if a specific associated function 'call recording' 723A is selected from the list, the controller 180 may control an activation of the selected specific associated function 'call recording' 723A to be set as the 2nd operation.

For instance, FIG. 23 (a) shows that the associated function is the function 'call recording' 723A. In this case, if the 1st NFC tag 210 is recognized in a situation that the event 'call reception' 712 does not occur, the controller 180 may perform the 1st operation. If the 1st NFC tag 210 is recognized in a situation that the event 'call reception' 712 occurs, the controller 180 may perform the 2nd operation in a manner of a voice or speech of a counterpart in the course of an ongoing call.

In the above description, the process for setting the event and the 2nd operation via the event situation setting icon 700 is explained in detail with reference to FIGS. 20 to 23.

The 2nd operation is non-limited by the operations described with reference to FIGS. 20 to 23 and the following operations and may include all functions and environment configuring operations, which are providable by or available for the mobile terminal.

In the following description, a process for copying and saving a setup user situation and a setup value of a 2nd operation between external NFC tags is explained with reference to FIG. 24.

Figure 24:
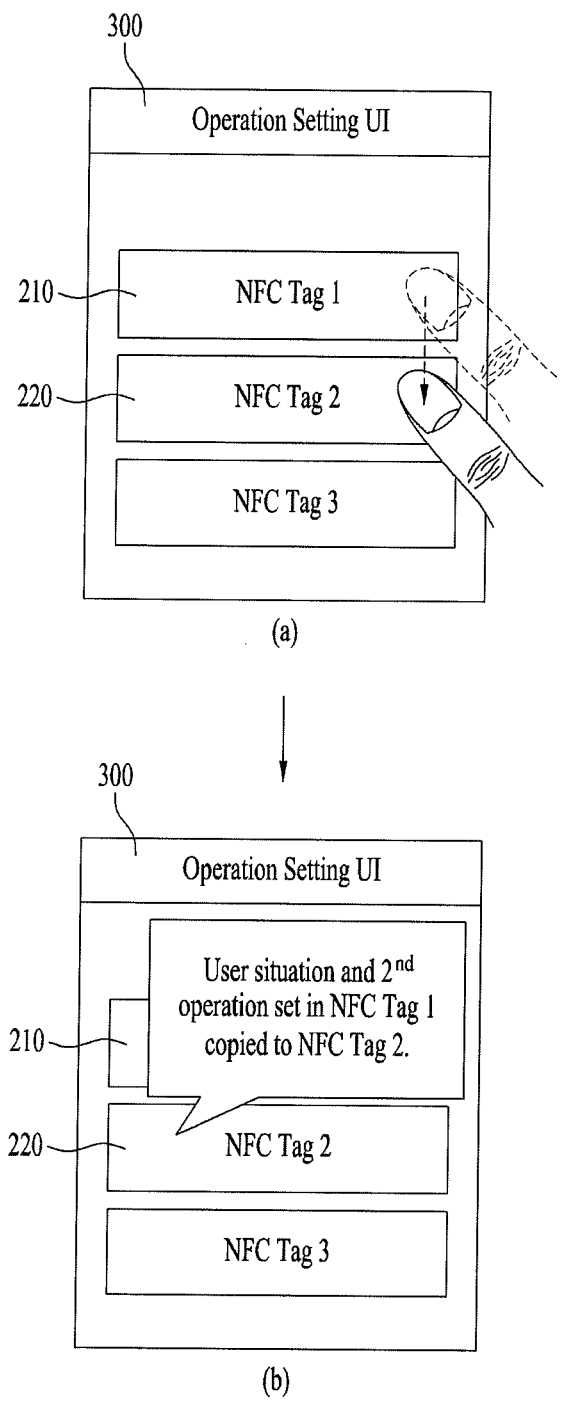

Referring to FIG. 24 (a), while the setup value according to the user situation and 2nd operation for the 1st NFC tag 210 are saved in the memory 160 of the mobile terminal 100 by one of the processes described with reference to FIGS. 3 to 23, the controller 180 may display a list of the NFC tags registered with the mobile terminal 100 in response to a request made by a user.

If both of the 1st and 2nd NFC tags 210 and 220 are selected or the 1st NFC tag 210 is touched and then dragged & dropped to the 2nd NFC tag 220, the controller 180 copies the setup value according to the user situation and 2nd operation for the 1st NFC tag 210 from the memory 160 and then saves the copied setup value as a setup value according to the user situation and $2^{nd}$ operation for the $2^{nd}$ NFC tag 220.

In particular, if a plurality of NFC tags are registered with the mobile terminal 100, a user is able to conveniently copy and save a setup value according to a user situation and $2^{nd}$ operation for a specific NFC tag as a setup value for another NFC tag.

In the above description, the process for setting the user situation and the $2^{nd}$ operation, which will be performed if the external NFC is recognized in a situation that the user situation is met, is explained in detail.

Meanwhile, according to the description with reference to FIGS. 3 to 24, the user situation includes one of the time situation, the location situation, the destination location situation, the function situation and the event situation. Moreover, the user situation may be configured in a manner of combining at least two of the time situation, the location situation, the destination location situation, the function situation and the event situation together.

For instance, while a specific time and a specific location are set as a user situation and a schedule is set as a $2^{nd}$ operation, if a $1^{st}$ NFC tag is recognized at the specific time and the specific location, the schedule is activated as the $2^{nd}$ operation.

For another instance, it may be possible to select two $2^{nd}$ operations for one user situation. For instance, when a specific time is set as a user situation, both a schedule and a memo (two operations) may be set as the $2^{nd}$ operation. In that case, if a $1^{st}$ NFC tag is recognized at the specific time, then the schedule and the memo are activated as the $2^{nd}$ operation. The schedule and the memo may be activated simultaneously or sequentially. If the two operations are to be performed simultaneously, the display screen's page can be split into at least two so as to provide both the schedule page and the memo page simultaneously. If the two operations are to be performed sequentially, then the two operations can be performed sequentially according to a priority set order, a user-set order, or a frequency use set order.

For another instance, while a specific time, a specific location and a specific function are set as a user situation and a schedule is set as a $2^{nd}$ operation, if a $1^{st}$ NFC tag is recognized in a situation that the specific time, the specific location and the specific function are ongoing, the specific function is activated as the $2^{nd}$ operation.

Moreover, if at least two user situations and at least two operations for the NFC tag 210 are set in the memory 160 and a situation of recognizing the $1^{st}$ NFC tag 210 meets both of the at least two user situations, it may be able to preferentially perform the $2^{nd}$ operation in accordance with the user situation corresponding to a priority given by a user.

For instance, assume that a time 'AM 7:00' and 'schedule function activation' are set in the memory 160, that a location 'company' and 'memo function activation' are set in the memory 160, and that a priority is given to the time 'AM 7:00' and 'schedule function activation'.

In this case, if the $1^{st}$ NFC tag 210 is recognized at the time 'AM 7:00' and the location 'company', the controller 180 activates the 'schedule function' corresponding to the time 'AM 7:00' having the priority. In another variation, the two operations (the schedule function and the memo function) may be executed simultaneously or sequentially when the $1^{st}$ NFC tag 210 is recognized at the time 'AM 7:00' and the location 'company'. In that case, the display screen's page can be split into at least two so as provide both the weather page and the memo page simultaneously, or such pages may be sequentially displayed. If the two operations are to be performed sequentially, then these operations can be performed sequentially according to a priority set order, a user-set order, or a frequency use set order.

In the following description, when at least one external NFC tag is recognized in a situation that a user situation is met based on the results set in FIGS. 3 to 24, a process for performing a $2^{nd}$ operation corresponding to the user situation is explained in detail with reference to FIGS. 25 to 33.

Figure 25:
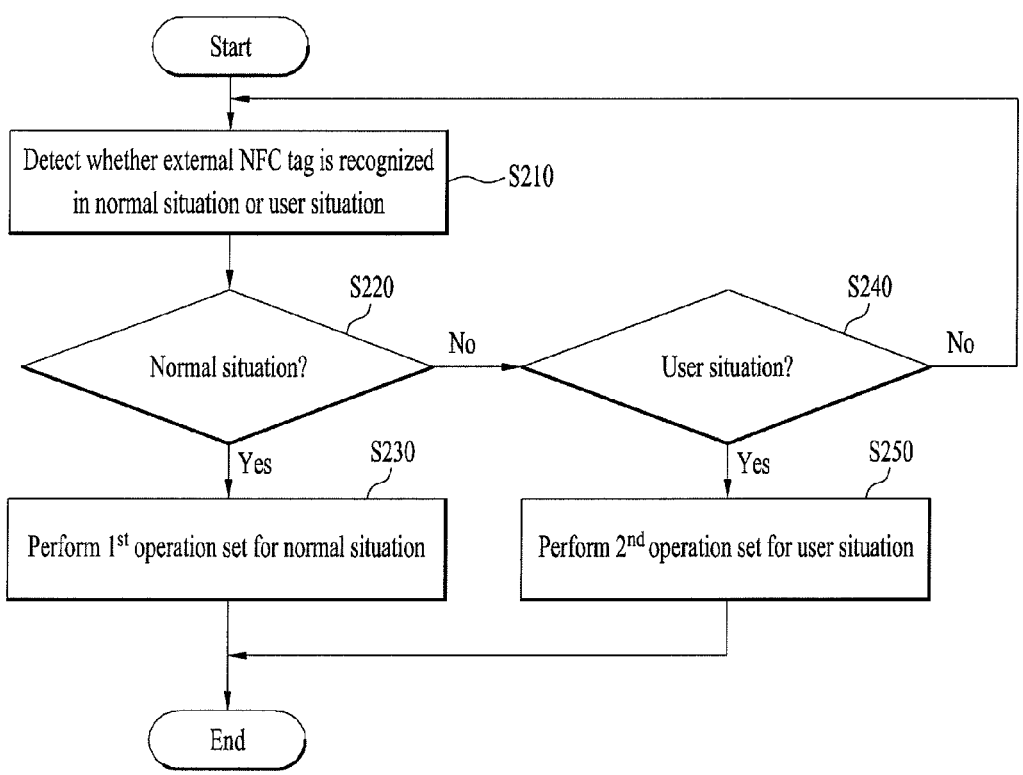
FIG. 25 is a flowchart for a method of controlling operations of a mobile terminal using at least one external NFC tag according to the present invention.

FIG. 25 is a flowchart for a method of controlling operations of a mobile terminal using at least one external NFC tag according to the present invention.

FIGS. 26 to 33 are diagrams for describing a method of controlling operations of a mobile terminal using at least one external NFC tag according to the present invention.

Referring to FIG. 25, while the setup value according to the user situation and the $2^{nd}$ operation for the $1^{st}$ NFC tag 210 is saved in the memory 160 by one of the processes shown in FIGS. 3 to 24, the controller 180 detects whether the $1^{st}$ NFC tag 210 is recognized in a normal situation or a user situation via the NFC module [S210].

In particular, in the memory 160, as mentioned in the foregoing description with reference to FIG. 4, the $1^{st}$ operation, which will be performed if the $1^{st}$ NFC tag 210 is recognized in the normal situation, and the $2^{nd}$ operation, which will be performed if the $1^{st}$ NFC tag 210 is recognized in one of the user situations set by the processes shown in FIGS. 3 to 24, are set or saved.

If the controller 180 detects that the $1^{st}$ NFC tag 210 is detected in the normal situation via the NFC module [S220], the controller 180 searches the memory 160 for the $1^{st}$ operation which will be performed in case of recognizing the $1^{st}$ NFC tag 210 in the normal situation and then performs the found $1^{st}$ operation [S230].

On the contrary, if the controller 180 detects that the $1^{st}$ NFC tag 210 is detected not in the normal situation but in the user situation via the NFC module [S240], the controller 180 searches the memory 160 for the $2^{nd}$ operation which will be performed in case of recognizing the $1^{st}$ NFC tag 210 in the user situation and then performs the found $2^{nd}$ operation [S250].

In doing so, the controller 180 may search the functions provided to the mobile terminal 100 for the functions associated with the $2^{nd}$ operation, display a list containing the found functions, and activate the function selected from the list. Moreover, the controller 180 may search the functions provided to the mobile terminal 100 for the functions associated with the $2^{nd}$ operation and activate the function having a preset priority among the found functions. In this case, the priority may be set up by a user and may include one of a user's recent use frequency of the associated functions, an index order of the associated functions, an evaluated point of a corresponding application for providing the associated functions, a priority set up by a user and the like.

Figure 26:
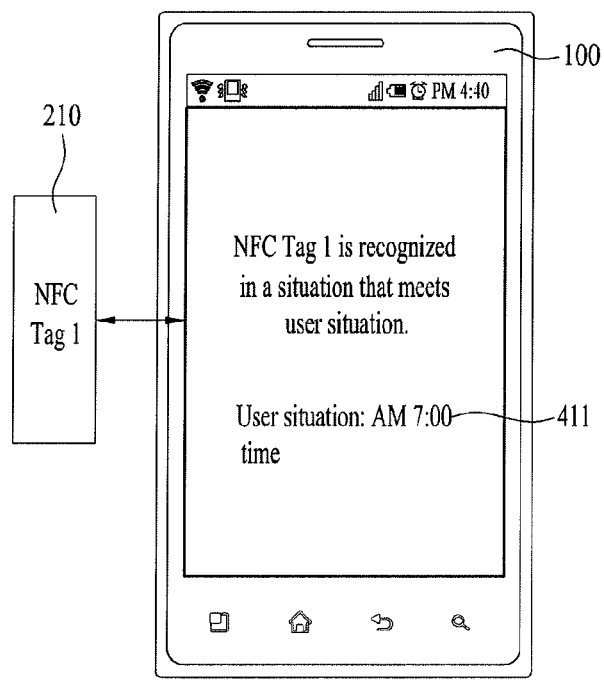
FIGS. 26 to 33 are diagrams for describing a method of controlling operations of a mobile terminal using at least one external NFC tag according to the present invention.
Figure 26:
Figure 27:
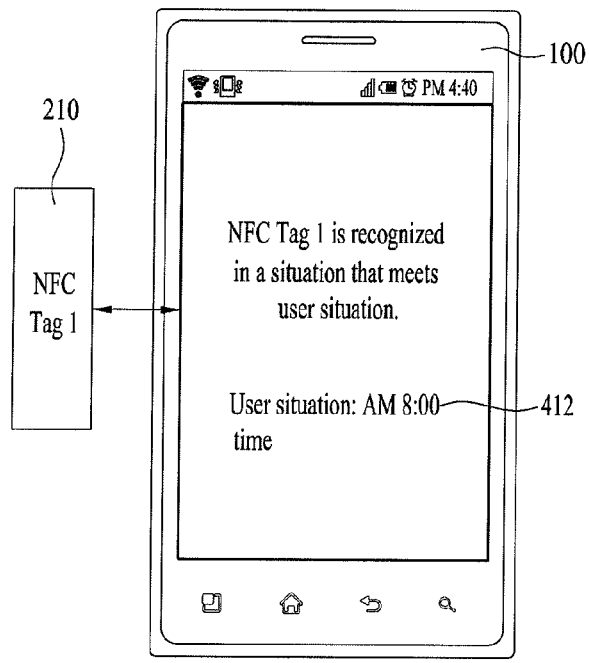
Figure 27:
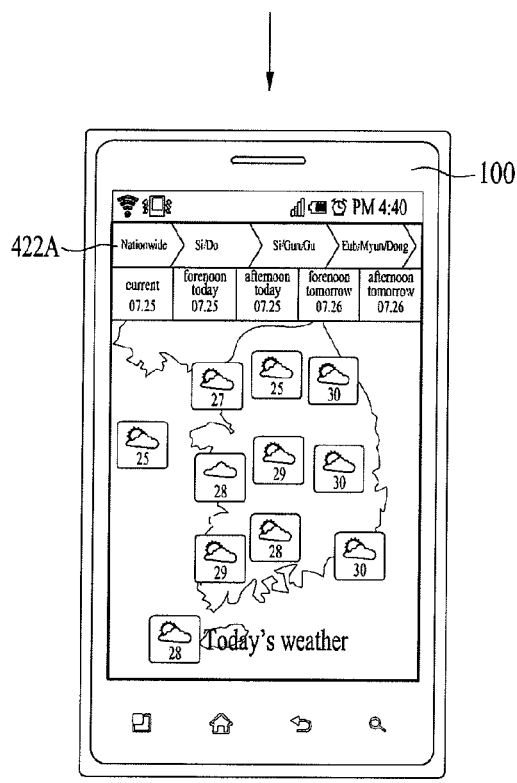
Figure 28:
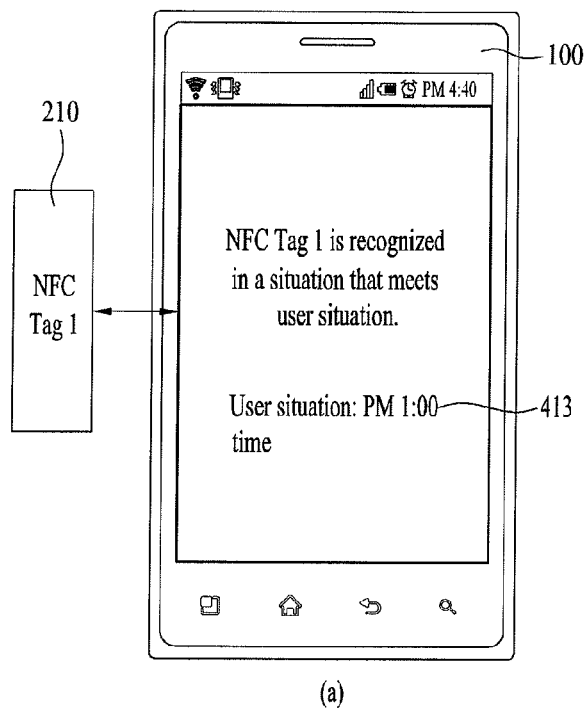
Figure 28:
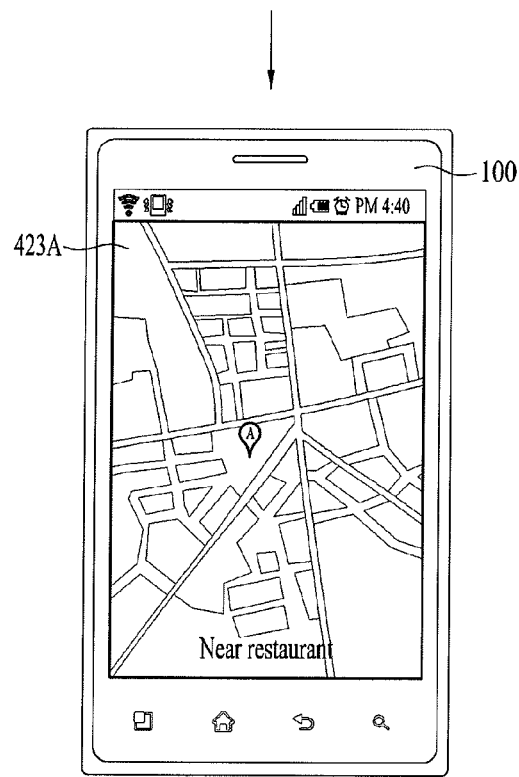

FIGS. 26 to 28 show examples of performing the $2^{nd}$ operation if the user situation is the time.

For instance, referring to FIG. 26, while the time 'AM 7:00' 411 and the schedule function 421A are set as the user situation and the $2^{nd}$ operation in the memory 160 by the process described with reference to FIG. 7, respectively, if the controller 180 detects that the $1^{st}$ NFC tag 210 is recognized at the time 'AM 7:00' 411 via the NFC module [FIG. 26 (a)], the controller 180 activates the schedule function 421A corresponding to the time 'AM 7:00' 411 [FIG. 26 (b)].

For another instance, referring to FIG. 27, while the time 'AM 8:00' 412 and the 'Today's weather' 421A are set as the user situation and the $2^{nd}$ operation in the memory 160 by the process described with reference to FIG. 8, respectively, if the controller 180 detects that the $1^{st}$ NFC tag 210 is recognized at the time 'AM 8:00' 412 via the NFC module [FIG. 27 (a)], the controller 180 activates the function of providing the information on the 'Toady's weather' 422A and then displays the information on the 'Today's weather' 422A via the activated function [FIG. 27 (b)].

For another instance, referring to FIG. 28, while the time 'PM 1:00' 413 and the 'near restaurant' 423A are set as the user situation and the $2^{nd}$ operation in the memory 160 by the process described with reference to FIG. 9, respectively, if the controller 180 detects that the $1^{st}$ NFC tag 210 is recognized at the time 'PM 1:00' 413 via the NFC module [FIG. 28 (a)], the controller 180 activates the function of providing the information on the 'near restaurant' 423A and then displays the information on the 'near restaurant' 423A via the activated function [FIG. 28 (b)].

Figure 29:
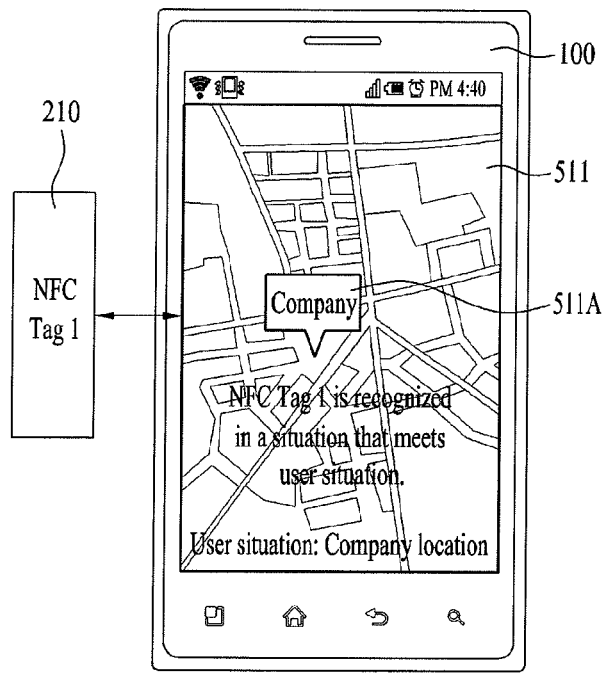
Figure 29:
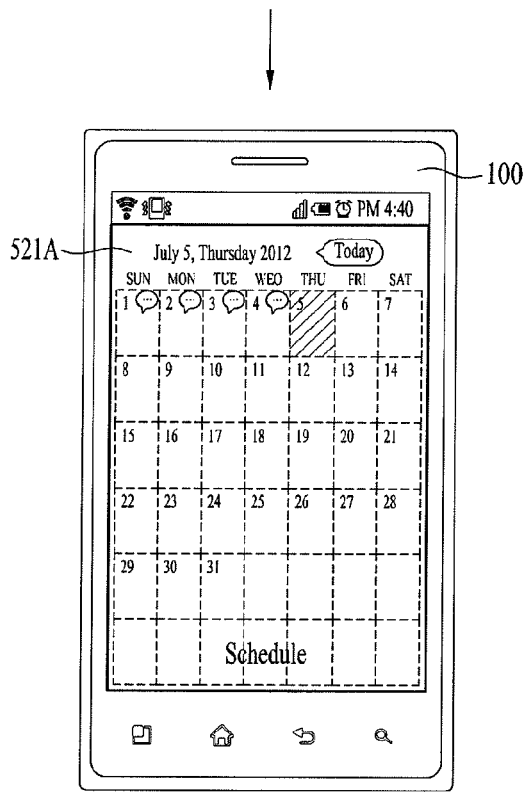

FIG. 29 shows one example of performing the $2^{nd}$ operation if the user situation is the location.

Referring to FIG. 29 (a), while the location 'company' 511 and the schedule function 521A are set as the user situation and the $2^{nd}$ operation in the memory 160 by the processes described with reference to FIG. 11 and FIG. 12, respectively, if the controller 180 detects that the $1^{st}$ NFC tag 210 is recognized via the NFC module in a situation that the current location of the mobile terminal 100 is the 'company' according to the position location module 115, the controller 180 searches for and displays a map image 511 indicating an area including the location 'company' and then marks the location 'company' on the map image 511. In this case, the map image 511 may be contained in the map provided to the memory 160 or may be found via a web.

Referring to FIG. 29 (b), the controller 180 activates the schedule function 521A corresponding to the location 'company' 511.

Figure 30:
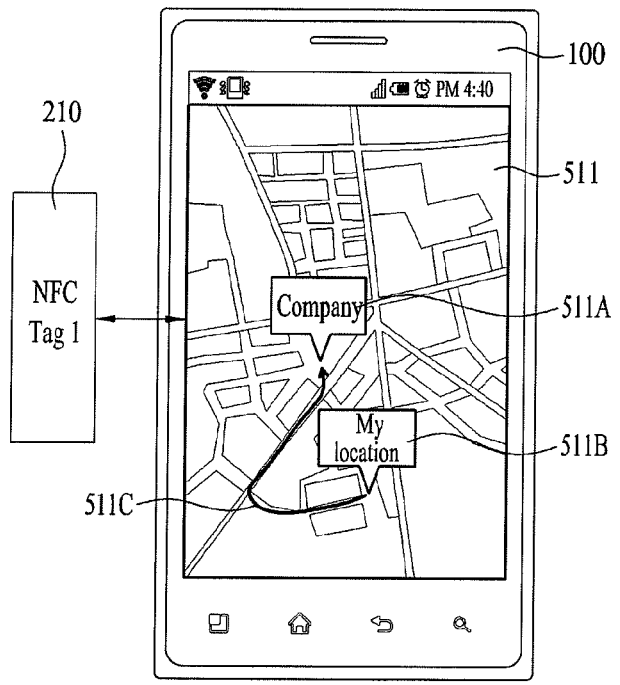
Figure 30:
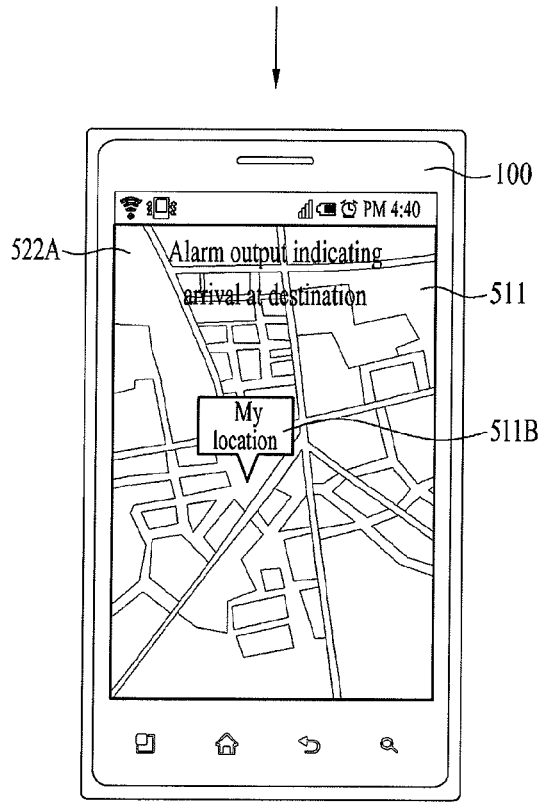

FIG. 30 shows one example of performing the $2^{nd}$ operation if the user situation is the destination location.

Referring to FIG. 30 (a), while the destination location 'company' 511A and the alarm output function 522A, which indicates that the location 51B of the mobile terminal 100 arrives at the destination location 'company' 511A, are set as the user situation and the $2^{nd}$ operation in the memory 160 by the processes described with reference to FIG. 14 and FIG. 15, respectively, if the controller 180 detects that the $1^{st}$ NFC tag 210 is recognized via the NFC module, the controller 180 periodically acquires the current location 511B of the mobile terminal 100 via the position location module 115.

The controller 180 searches for and displays a map image 511 indicating an area which includes the periodically acquired current location 511B of the mobile terminal 100 and the destination location 'company' 511A and periodically acquires a moving path 511C to the destination location 'company' 511A based on the acquired current location 511B of the mobile terminal 100.

Subsequently, the controller 180 displays the periodically acquired current location 51B of the mobile terminal 100, the destination location 'company' 511A, and the periodically acquired moving path 511C on the map image 511.

Thereafter, referring to FIG. 30 (b), if the periodically acquired current location 511B of the mobile terminal 100 arrives at the destination location 'company' 511A, the controller 180 activates the alarm output function of indicating that the location 511B of the mobile terminal 100 arrives at the destination location 'company' 511A as the $2^{nd}$ operation and then outputs a preset alarm via the alarm output function.

Figure 31:
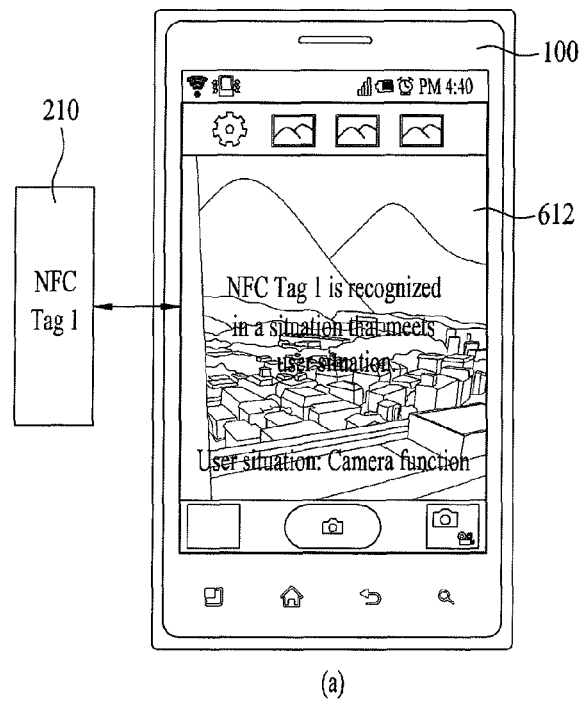
Figure 31:
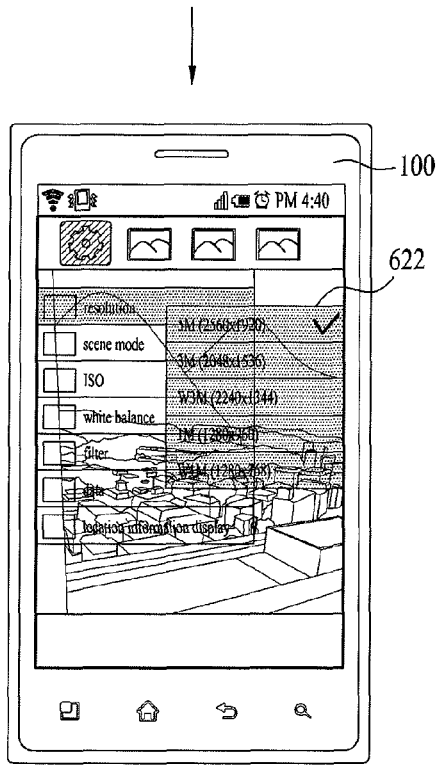

FIG. 31 shows one example of performing the $2^{nd}$ operation if the user situation is an ongoing situation of a specific function.

Referring to FIG. 31, while the camera function 612 and the environment configuration menu 622 of the camera are set as the user situation and the $2^{nd}$ operation in the memory 160 by the processes described with reference to FIGS. 16 to 19, respectively, if the controller 180 detects that the $1^{st}$ NFC tag 210 is recognized via the NFC module in a situation that the camera function 612 is ongoing [FIG. 31 (a)], the controller 180 displays the environment configuration menu 622 of the camera as the $2^{nd}$ operation [FIG. 31 (b)].

Figure 32:
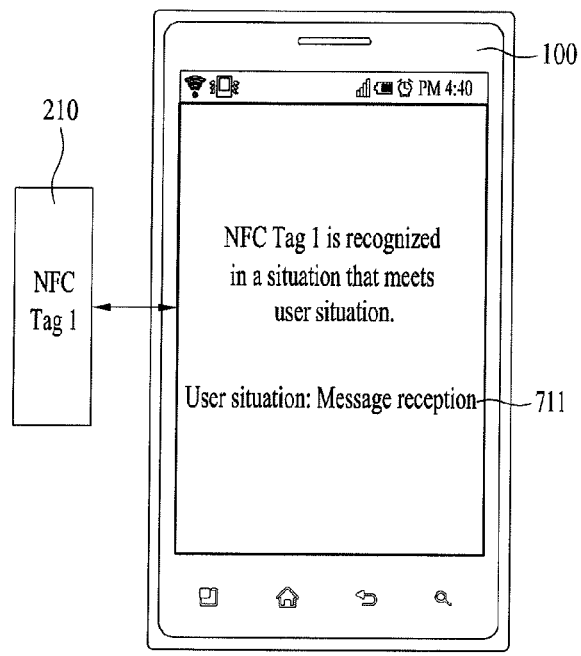
Figure 32:
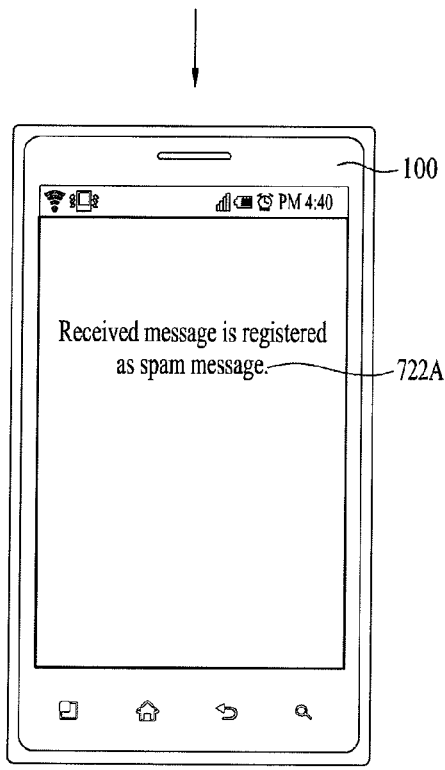
Figure 33:
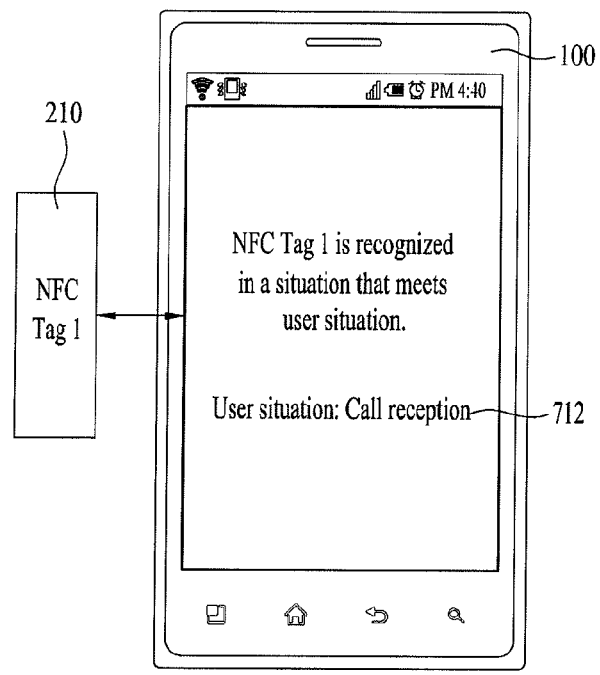
Figure 33:
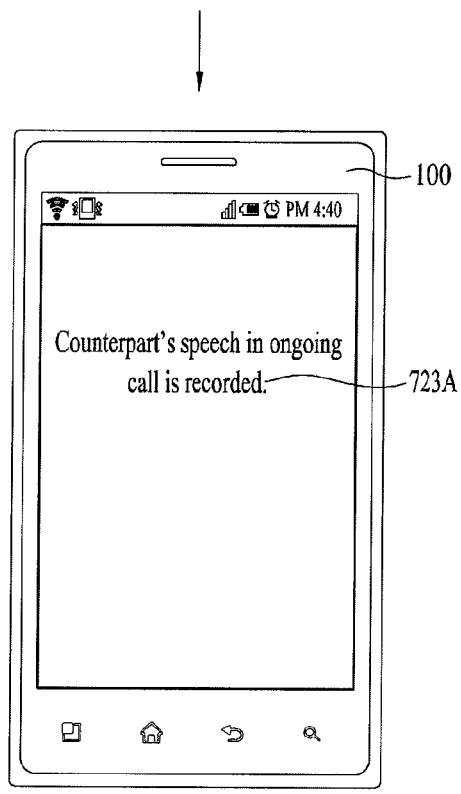

FIG. 32 and FIG. 33 show examples of performing the $2^{nd}$ operation if the user situation is an occurrence of an event.

For instance, referring to FIG. 32, while the event 'message reception' 711 and the function 'spam message registration' 722A are set as the user situation and the $2^{nd}$ operation in the memory 160 by the processes described with reference to FIG. 21 and FIG. 22, respectively, if the controller 180 detects that the $1^{st}$ NFC tag 210 is recognized via the NFC module in a situation that the event 'message reception' 711 has occurred [FIG. 32 (a)], the controller 180 performs the $2^{nd}$ operation in a manner of registering the received message as a spam message [FIG. 32 (b)].

For another instance, referring to FIG. 33, while the event 'call reception' 712 and the function 'call recording' 723A are set as the user situation and the $2^{nd}$ operation in the memory 160 by the process described with reference to FIG. 23, respectively, if the controller 180 detects that the $1^{st}$ NFC tag 210 is recognized via the NFC module in a situation that the event 'call reception' 712 has occurred [FIG. 33 (a)], the controller 180 connects the call, records a call speed received from an originator of the call, and then saves the recorded call speech in the memory 160 [FIG. 33 (b)].

Accordingly, embodiments of the present invention provide various effects and/or features.

First of all, if an external NFC tag recognized situation is not a situation set up by a user, a previous function set for the external NFC tag is provided to the user. If an external NFC tag recognized situation is a situation set up by a user, a function different from the previous function is provided to the user. Therefore, the present invention provides a user with various kinds of functions of a mobile terminal using NFC tag.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display unit;
   an NFC (Near Field Communication) module configured to recognize at least one NFC tag disposed external to the mobile terminal, and to read information stored in the external NFC tag;
   a memory configured to store a specific situation associated with the external NFC tag, a $1^{st}$ operation to be performed if the external NFC tag is recognized in a non-specific situation, and a $2^{nd}$ operation to be performed if the external NFC tag is recognized in the specific situation; and
   a controller configured to determine whether the specific situation associated with the external NFC tag has occurred or is occurring when the NFC module recognizes the external NFC tag, and to perform the $1^{st}$ operation if the external NFC tag is recognized in the non-specific situation and the $2^{nd}$ operation if the external NFC tag is recognized in the specific situation based on the determination result, wherein the specific situation corresponds to a preset time, a preset location, the mobile terminal activating a preset function, and a preset event occurring on the mobile terminal, wherein the controller performs the $2^{nd}$ operation if the external NFC tag is recognized at the preset time, the mobile terminal is located at the preset location, the mobile terminal is activating the preset function and the preset event is occurring on the mobile terminal, and wherein the $2^{nd}$ operation comprises an operation of activating a function set up by a user among a plurality of functions provided to the mobile terminal.

2. The mobile terminal of claim 1, wherein the controller performs the $1^{st}$ operation if the external NFC tag is recognized at a time different from the preset time.

3. The mobile terminal of claim 2, wherein if the external NFC tag is recognized at the preset time, the controller searches a plurality of functions provided to the mobile terminal for at least one function associated with the $2^{nd}$ operation, displays a list containing the found at least one function, and performs a function selected from the list as the $2^{nd}$ operation.

4. The mobile terminal of claim 2, wherein if the external NFC tag is recognized at the preset time, the controller searches a plurality of functions provided to the mobile terminal for at least two functions associated with the $2^{nd}$ operation, and performs a function having a preset priority among the found at least two functions as the $2^{nd}$ operation.

5. The mobile terminal of claim 2, wherein the controller displays, on the display unit, a UI (User Interface) for setting the preset time and the $2^{nd}$ operation, wherein the controller stores, in the memory, the preset time set via the user interface and the $2^{nd}$ operation set via the user interface by mapping the set preset time and the set $2^{nd}$ operation to each other, and wherein if the NFC module recognizes the external NFC tag at the stored preset time, the controller performs the $2^{nd}$ operation mapped to the stored preset time.

6. The mobile terminal of claim 5, wherein when setting the $2^{nd}$ operation for the preset time using the UI, the controller receives a keyword corresponding to the $2^{nd}$ operation via the UI, searches functions provided to the mobile terminal for at least one function associated with the keyword, and displays the found at least one function on the display unit, and wherein when the displayed function is selected, the controller sets the selected displayed function as the $2^{nd}$ operation for the preset time.

7. The mobile terminal of claim 1, further comprising:

a position location module configured to acquire a current location of the mobile terminal, wherein if the external NFC tag is recognized, the controller acquires the current location of the mobile terminal via the position location module, and wherein the controller performs the $2^{nd}$ operation when the acquired current location of the mobile terminal corresponds to the preset location.

8. The mobile terminal of claim 7, wherein the $2^{nd}$ operation comprises an activation operation of at least one function associated with the preset location among a plurality of functions provided to the mobile terminal.

9. The mobile terminal of claim 7, wherein if the acquired current location of the mobile terminal corresponds to the preset location, the controller searches for a map image containing the preset location, and r displays the searched map image with the preset location indicated on the displayed map image.

10. The mobile terminal of claim 7, wherein the controller, on the display unit, displays a UI (User Interface) for setting the preset location and the $2^{nd}$ operation, wherein the controller stores, in the memory, the preset location set via the user interface and the $2^{nd}$ operation set via the user interface by mapping the set preset location and the set $2^{nd}$ operation to each other, and wherein if the acquired current location of the mobile terminal corresponds to the stored preset location, the controller performs the stored $2^{nd}$ operation mapped to the stored preset location.

11. The mobile terminal of claim 1, further comprising:

a position location module configured to acquire a current location of the mobile terminal, wherein the specific situation comprises at least one preset destination location, wherein if the external NFC tag is recognized, the controller periodically acquires the current location of the mobile terminal via the position location module, and wherein the controller performs the $2^{nd}$ operation when the if the acquired current location of the mobile terminal arrives at the destination location.

12. The mobile terminal of claim 11, wherein the controller acquires a moving path of the mobile terminal starting from a location in which the external NFC tag was recognized to the preset destination location, and displays information indicating the acquired moving path on the display unit.

13. The mobile terminal of claim 12, wherein the controller searches for a map image including the location in which the external NFC tag was recognized and the preset destination location, and displays the moving path on the searched map image.

14. The mobile terminal of claim 11, wherein the $2^{nd}$ operation comprises an activation of an operation of alerting that the mobile terminal has arrived at the preset destination location.

15. The mobile terminal of claim 11, wherein the $2^{nd}$ operation comprises at least one of the following:

an activation of a function set by a user among functions provided to the mobile terminal, an activation of at least one function associated with the preset destination location among the functions provided to the mobile terminal, and an activation of an operation of displaying information indicating at least one place associated with the preset destination location.

16. The mobile terminal of claim 11, wherein the controller displays, on the display unit, a UI (User Interface) for setting the preset destination location and the $2^{nd}$ operation, wherein the controller stores in the memory the preset destination location set via the user interface and the $2^{nd}$ operation set via the user interface by mapping the set preset destination location and the set $2^{nd}$ operation to each other, and wherein if a current location of the mobile terminal arrives at the destination location, the controller performs the stored set $2^{nd}$ operation mapped to the stored preset destination location.

17. The mobile terminal of claim 1, wherein the controller performs the 2nd operation when the external NFC tag is recognized when the preset function of the mobile terminal is being activated.

18. The mobile terminal of claim 17, wherein the $2^{nd}$ operation comprises an activation of a sub-function belonging to the preset function being activated.

19. The mobile terminal of claim 1,
wherein the controller performs the 2nd operation when the external NFC tag is recognized when the preset event is occurring or has occurred.

20. The mobile terminal of claim 19, wherein the $2^{nd}$ operation comprises an activation of at least one function associated with the preset event that is occurring or has occurred among functions provided to the mobile terminal.

21. The mobile terminal of claim 1, wherein the specific situation comprises at least one of a time occurring situation, a location occurring situation, a function occurring situation, and an event occurring situation.

22. The mobile terminal of claim 21, wherein the specific situation is set to be an occurrence of at least two of the time occurring situation, the location occurring situation, the function occurring situation and the event occurring situation, and
wherein when the at least two of the time occurring situation, the location occurring situation, the function occurring situation and the event occurring situation have occurred or are occurring, the controller performs the $2^{nd}$ operation.

23. The mobile terminal of claim 22, wherein the $2^{nd}$ operation includes at least two different operations to be performed sequentially or simultaneously.

24. The mobile terminal of claim 21, wherein the $2^{nd}$ operation includes at least two different operations to be performed sequentially or simultaneously.

25. A method of controlling a mobile terminal including an NFC (Near Field Communication) module and a memory, the method comprising:
recognizing, by the NFC module, at least one NFC tag disposed external to the mobile terminal, and reading information stored in the external NFC tag;
storing, in the memory, a specific situation associated with the external NFC tag, a 1st operation to be performed if the external NFC tag is recognized in a non-specific situation, and a $2^{nd}$ operation to be performed if the external NFC tag is recognized in the specific situation;
determining, by the mobile terminal, whether the specific situation associated with the external NFC tag has occurred or is occurring when the external NFC tag is recognized; and
based on the determination result, performing the $1^{st}$ operation if the external NFC tag is recognized in the non-specific situation and the $2^{nd}$ operation if the external NFC tag is recognized in the specific situation,
wherein the specific situation corresponds to a preset time, a preset location, the mobile terminal activating a preset function, and a preset event occurring on the mobile terminal,
wherein the performing step performs the $2^{nd}$ operation if the external NFC tag is recognized at the preset time, the mobile terminal is located at the preset location the mobile terminal is activating the preset function and the preset event is occurring on the mobile terminal, and
wherein the $2^{nd}$ operation comprises an operation of activating a function set up by a user among a plurality of functions provided to the mobile terminal.

* * * * *